US00RE48560E

(19) United States
(12) Reissued Patent
Mizek

(10) Patent Number: US RE48,560 E
(45) **Date of Reissued Patent: *May 18, 2021**

(54) BROADHEAD

(71) Applicant: Bear Archery, Inc., Evansville, IN (US)

(72) Inventor: Robert Mizek, Lemont, IL (US)

(73) Assignee: Bear Archery, Inc., Evansville, IN (US)

( * ) Notice: This patent is subject to a terminal disclaimer.

(21) Appl. No.: 16/394,379

(22) Filed: Apr. 25, 2019

Related U.S. Patent Documents

Reissue of:
(64) Patent No.: 9,664,484
Issued: May 30, 2017
Appl. No.: 15/014,488
Filed: Feb. 3, 2016

U.S. Applications:
(63) Continuation of application No. 14/726,918, filed on Jun. 1, 2015, now Pat. No. 9,267,773.

(51) Int. Cl.
*F42B 6/08* (2006.01)

(52) U.S. Cl.
CPC ..... *F42B 6/08* (2013.01)

(58) Field of Classification Search
USPC ..... 473/583
See application file for complete search history.

(56) References Cited

U.S. PATENT DOCUMENTS 2,859,970 A 11/1958 Doonan
2,993,697 A 7/1961 Urban
3,014,305 A 12/1961 Yurchich
3,578,328 A 5/1971 Rickey
3,600,835 A * 8/1971 Hendricks ..... A01K 81/04 43/6
4,099,720 A 7/1978 Zeren
4,671,517 A 6/1987 Winters
4,973,060 A 11/1990 Herzing
4,976,443 A 12/1990 DeLucia
4,998,738 A 3/1991 Puckett
5,066,021 A 11/1991 DeLucia
5,082,292 A 1/1992 Puckett et al.
5,083,798 A 1/1992 Massey
5,100,143 A 3/1992 Puckett
5,322,297 A 6/1994 Smith
5,472,213 A 12/1995 Dudley
5,496,042 A 3/1996 Craft et al.
5,941,784 A 8/1999 Mizek
6,165,086 A 12/2000 Liechty
6,200,237 B1 3/2001 Barrie
6,258,000 B1 7/2001 Liechty, II
6,270,435 B1 8/2001 Sodaro
6,517,454 B2 2/2003 Barrie et al.
6,626,776 B2 9/2003 Barrie et al.
6,669,586 B2 12/2003 Barrie et al.
6,935,976 B1 8/2005 Grace et al.
(Continued)

*Primary Examiner* — Jeffrey R Jastrzab

(74) *Attorney, Agent, or Firm* — Woodard, Emhardt, Henry, Reeves & Wagner, LLP

(57) ABSTRACT

Various embodiments of the present disclosure include a mechanical broadhead for use with an archery bow and arrow. In certain arrangements, a broadhead is provided that maintains the cutting blades in a retracted or closed position during flight of the arrow. Upon target contact, the blades expand outwardly from the closed position.

39 Claims, 25 Drawing Sheets

(56) References Cited

U.S. PATENT DOCUMENTS

| | | | | |
|---|---|---|---|---|
| 7,226,375 | B1 | 6/2007 | Sanford | |
| 7,234,220 | B1 | 6/2007 | Grace, Jr. | |
| 8,210,970 | B1 * | 7/2012 | Sanford | F42B 6/08 473/583 |
| 8,398,510 | B1 | 3/2013 | Mizek | F42B 6/08 473/583 |
| RE44,144 | E | 4/2013 | Barrie et al. | |
| 8,449,415 | B2 | 5/2013 | Grace | |
| 8,496,550 | B2 | 7/2013 | Zeren | |
| 8,771,112 | B2 | 7/2014 | Sanford | |
| 9,267,773 | B2 * | 2/2016 | Mizek | F42B 6/08 |
| 2006/0084535 | A1 | 4/2006 | Kuhn | |
| 2009/0111621 | A1 | 4/2009 | Mizek | |
| 2009/0203477 | A1 | 8/2009 | Mizek et al. | F42B 6/08 473/583 |
| 2010/0173734 | A1 | 7/2010 | Robbins | |
| 2011/0165977 | A1 | 7/2011 | Adams et al. | |
| 2012/0202626 | A1 * | 8/2012 | Sanford | F42B 6/08 473/584 |
| 2013/0102426 | A1 * | 4/2013 | Mizek | F42B 6/08 473/583 |
| 2013/0190112 | A1 * | 7/2013 | Pedersen | F42B 6/08 473/583 |
| 2015/0168112 | A1 | 6/2015 | Hollars | |
| 2015/0354928 | A1 * | 12/2015 | Mizek | F42B 6/08 473/583 |
| 2016/0047637 | A1 * | 2/2016 | Salvino | F42B 6/08 473/583 |

* cited by examiner

BROADHEAD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue of U.S. Pat. No. 9,664,484 issued on May 30, 2017.*

CROSS-REFERENCE TO RELATED APPLICATIONS

This application is a continuation of application Ser. No. 14/726,918 filed on Jun. 1, 2015 and claims the benefit of U.S. Provisional Patent Application Ser. No. 62/007,620 filed on Jun. 4, 2014 and U.S. Provisional Patent Application Ser. No. 62/024,107 filed on Jul. 14, 2014, which are incorporated herein by reference in their entirety.

FIELD OF ENDEAVOR

This disclosure relates broadly to an expandable broadhead for arrows and more particularly to a broadhead having a mechanism to outwardly extend the blades upon impact with a target.

BACKGROUND

In archery, a fired arrow is equipped with a point or head that engages a target. In bowhunting, a broadhead type of arrowhead may be used to increase damage to or bleeding of the target and otherwise facilitate capture of the target. Some broadheads are fired in a closed, aerodynamic position, and, upon impact with a target, are mechanically activated to expand and provide a broader cutting diameter.

SUMMARY

Various embodiments of the present disclosure include a mechanical broadhead for use with an archery bow and arrow. In certain arrangements, a broadhead is provided that maintains the cutting blades in a retracted or closed position during flight of the arrow. Upon target contact, the blades expand outwardly from the closed position.

In certain embodiments, the broadhead includes a body defining a shaft portion. A hub is slidably mounted on the shaft portion. One or more cutting blades are pivotally attached to the hub. A retaining element biases the blades to a closed position. Optionally, the blades abut a rearward shelf on the body which assists to maintain the blades in a closed position prior to impact. Upon impact, the target surface impacts the leading edges of the blade and hub assembly. The initial impact causes an initial unlocking rotation of the blades, which disengages the blades from the rearward shelf and which may break or dislodge the retaining member. As the broadhead continues to travel forward, the hub and blade assembly moves rearward relative to the shaft portion. The blades are balanced and synchronized to slide along camming surfaces so that the blades rotate outward to a deployed position. As the blades and hub reach their rearwardmost position the blades are locked in the deployed, fully expanded position.

In certain alternate embodiments, arranged between each blade and hub is an activation arm. The activation arms are pivotally attached to the exterior of hub. A forward edge of each activation arm forms an impact surface. A central area of each activation arm surrounds and engages the upper end portion of a blade. The engagement between the activation arm and the blade upper end portion rotationally locks the blade and activation arm together. Optionally, each activation arm includes a retention feature which engages hub to inhibit rotation of the activation arm and blade when the broadhead is in the closed position.

In certain further embodiments, arranged forward of a hub and blades is a deployment slider. The rearward surface of deployment slider abuts the forward surface of the hub. The slider includes impact arms which extend laterally in front of each blade. Each impact arm defines a forward facing impact edge or surface. The rearward face of each impact arm defines a surface with a length and width which covers and abuts a blade forward edge when the broadhead is in the closed position. The impact arms have outer ends which receive and partially encircle a blade leading tip or corner. The slider engages the blades in the closed position to inhibit rotation of the blades prior to launch and during flight.

In certain further embodiments, a broadhead arrowhead includes a broadhead body adapted to attach to an arrow shaft, the broadhead body having a forward end and having a shaft portion between the forward end and a rearward shelf, the shaft portion defining a longitudinal axis. A hub and blade assembly includes a hub slidably mounted on the shaft portion between the forward end and the shelf. At least one blade is pivotally attached to the exterior of the hub and operable between a closed position and an open position. A deployment slider is arranged on the broadhead body forward of the hub and blade assembly, the deployment slider having a slider body and at least one laterally extending impact arm, with the impact arm configured to retain the at least one blade in a closed position. The at least one blade abuts the shelf in a closed position prior to impact and wherein an impact causes an unlocking rotation of the blade which disengages the blade from the rearward shelf and the impact arm. After the initial impact, the slider body and the hub and blade assembly move rearward relative to the shaft portion. During the rearward movement the blades slide upon a camming surface defined by the shelf, forcing the blades to rotate outward to a deployed position; so that when the hub and blade assembly reaches a rearwardmost position the blades are locked in a deployed, fully expanded position.

Certain alternate embodiments encompass a broadhead arrowhead having a broadhead body adapted to attach to an arrow shaft, the broadhead body having a forward end and having a shaft portion, the shaft portion defining a longitudinal axis. A hub and blade assembly including a hub is slidably mounted on the shaft portion and a plurality of blades are pivotally attached to the exterior of the hub, each blade operable between a closed position and an open position. A deployment slider is arranged on the broadhead body forward of the hub and blade assembly, the deployment slider having a slider body and a plurality of impact arms, with an impact arm extending laterally in front of each blade and configured to retain the respective blade in a closed position. Wherein upon an initial impact, each blade rotates and is no longer retained by the respective impact arm; and wherein after the initial impact, the slider body and the hub and blade assembly move rearward relative to the shaft portion and wherein during the rearward movement the blades rotate outward to a deployed position.

In still further alternate embodiments, a broadhead arrowhead includes a broadhead body adapted to attach to an arrow shaft, the broadhead body having a forward end and having a shaft portion, the shaft portion defining a longitudinal axis. A hub and blade assembly including a hub is slidably retained on the shaft portion, and a plurality of blades are pivotally attached to the exterior of the hub and operable between a closed position and an open position. Each blade has a sharpened outward cutting edge and a forward facing edge, and each blade defines a plane parallel to and offset from the longitudinal axis. A deployment slider is arranged on the broadhead body forward of the hub and blade assembly. The deployment slider has a slider body and a plurality of impact arms, with each impact arm extending laterally in front of and covering the forward facing edge of a respective blade. Wherein each impact arm is designed to break away from the slider body upon impact.

Other objects and attendant advantages will be readily appreciated as the same become better understood by references to the following detailed description when considered in connection with the accompanying drawings.

DETAILED DESCRIPTION OF EMBODIMENTS

Figure 1:
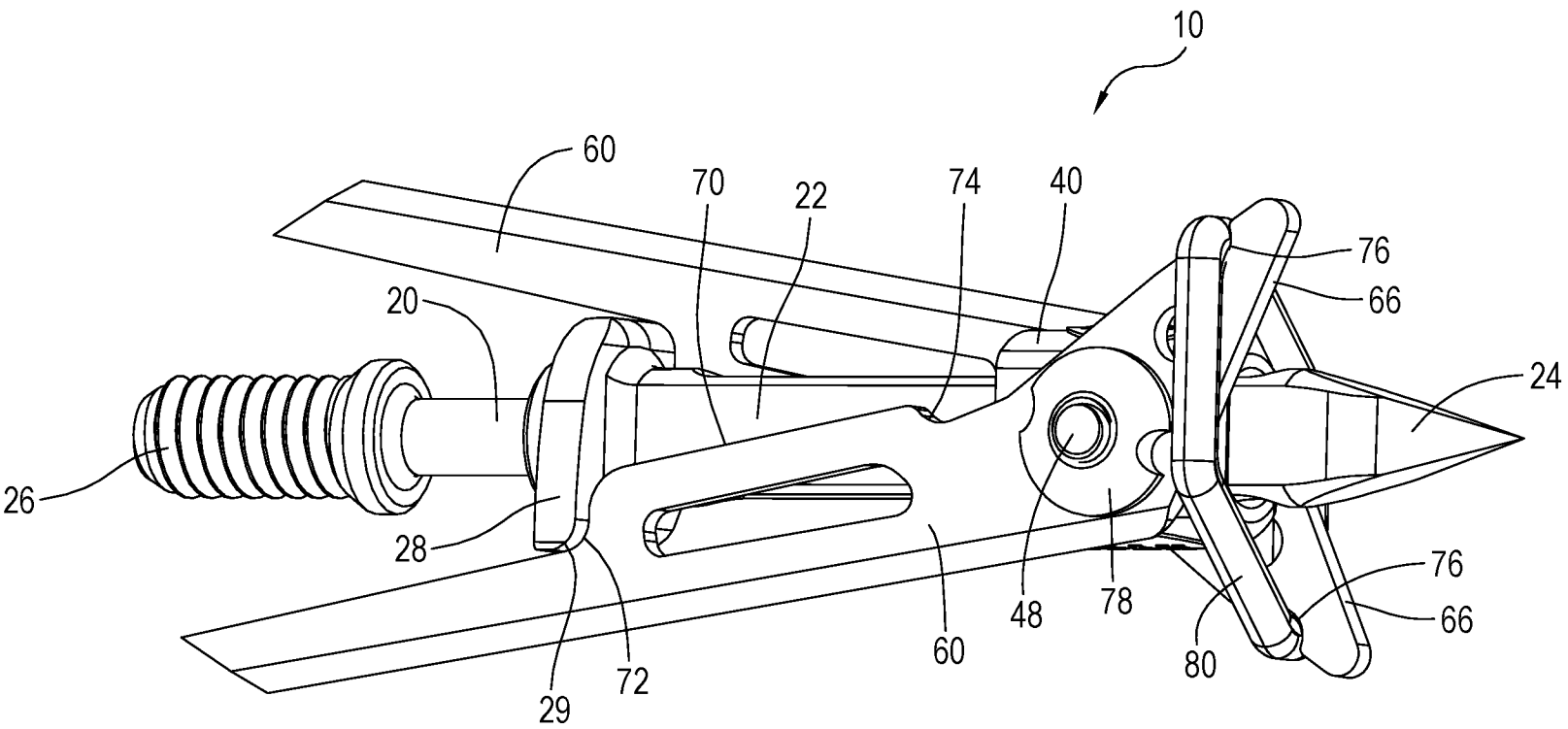
FIG. 1 is a side view of a mechanical broadhead in a closed position according to an embodiment of the disclosure.

For the purposes of promoting an understanding of the principles of the disclosure, reference will now be made to the embodiments illustrated and specific language will be used to describe the same. It will nevertheless be understood that no limitation of the scope of the disclosure is thereby intended, such alterations, modifications, and further applications of the principles being contemplated as would normally occur to one skilled in the art to which the invention relates Various embodiments of the present disclosure include a mechanical broadhead for use with an archery bow and arrow that maintains the cutting blades in a retracted or closed position during a flight of the arrow. In some embodiments, a hub and blade assembly is slidably mounted on the shaft portion of a broadhead body. One or more blades are pivotally attached to the hub and are operable between a closed position and an open position. In certain embodiments, a deployment slider is arranged on the broadhead body forward of the hub and blade assembly. The deployment slider has a slider body and a plurality of impact arms, with each impact arm engagable to retain a blade in the closed position prior to launch and during flight of the arrow. Upon target impact, the blades expand from the closed position to an open position.

Directional references herein are for ease of explanation and are not intended to be limiting.

FIGS. 1-6 show views of an embodiment of a broadhead generally designated 10. The broadhead 10 is adapted for mounting to an open end of a hollow arrow shaft. The broadhead 10 includes a body 20. Body 20 has a forward end with a pointed tip 24, and a rearward end 26 configured to be connected to an arrow shaft. For example, rearward end 26 may include threads configured for pairing with threads inside of the arrow shaft. In other forms, broadhead 10 may be mounted to an arrow shaft in other ways, such as with mechanical fasteners, adhesives, resins, mounting on a ferrule or arrow shaft insert, or using other attachment techniques.

The forward end of broadhead body 20 includes tip 24. The tip 24 may be made integrally with or separate and attached to a forward portion of a central shaft 22. Typically, the pointed tip 24 is tapered rearwardly and outwardly. The tip base may extend outward from or may merge with the profile of shaft 22. Shaft 22 preferably is formed with a non-circular cross-section, for example in the illustrated embodiment shaft 22 has a substantially square cross-section.

In certain embodiments, a rearward portion of shaft 22 transitions into a shelf or ledge 28, extending radially outward from at least portions of the sides of shaft 22.

Certain edges of shelf or ledge 28 may form camming surfaces 29. A portion of body 20 extends rearward from shelf 28 to rearward end 26. Body 20 can be integrally made as a single piece. Alternately, body 20 may be assembled from one or more pieces secured together.

Hub 40 is slidably mounted on shaft 22, typically between tip 24 and shelf 28. Hub 40 is operable to translate forward or rearward relative to shaft 22. Hub 40 defines an interior passage 42 with a cross-section sized and shaped to approximately match the cross-section of shaft 22 and which inhibits rotation of hub 40 with respect to shaft 22. In the illustrated embodiment, a pair of retaining balls 56 are mounted between a pair of opposing internal sides of hub 40 and shaft 22 on opposing sides of shaft 22. Portions of retaining balls 56 are partially received in openings 46 defined in opposing sides of hub 40. In certain embodiments, openings 46 are smaller than the diameter of retaining balls 56 and prevent the retaining balls from escaping the hub. Alternately, openings 46 may be the same size or slightly larger than the diameter of retaining balls 56 to allow the balls to be introduced during assembly, and the retaining balls are then retained in hub 40, for example with adhesive or with a cover applied over the openings. A cover may include marking indicia such as a product name.

When hub 40 is in its forward-most position, typically adjacent tip 24, portions of retaining balls 56 are received in recesses 36 defined adjacent the forward end of shaft 22. As hub 40 slides rearward during deployment, the retaining balls leave forward recesses 36 and transition partially into a pair of recessed grooves 38 defined on opposing sides of shaft 22. The retaining balls may be made from a semi-resilient material or a non-compressible material. Example materials include nylon, plastics such as a DELRIN® self-lubricating plastic or a metal such as steel. Recesses 36, openings 46 and retaining balls 56 are preferably sized with an interference fit to initially resist rearward movement of hub 40. When a sufficiently rearward force is applied the balls are compressed and/or pushed into openings 46 a sufficient distance to allow the balls to leave recesses 36 allowing the hub to begin sliding rearward. As hub 40 continues to slide rearward, the retaining balls translate along grooves 38.

Hub 40 includes a pair of mounting posts 48 extending outward perpendicular to the longitudinal axis of shaft 22. Mounting posts 48 are arranged on opposing exterior sides of hub 40, typically on alternate sides from openings 46.

One or more cutting blades 60 are pivotally attached to the exterior of hub 40. As illustrated, the flat sides of each blade define a plane which is parallel to yet offset or angled so the plane does not intersect the longitudinal axis of shaft 22. In the illustrated embodiment, a pair of blades 60 are pivotally mounted to hub 40. As illustrated, the planes of the two blades are parallel to each other on opposing sides of the longitudinal axis of shaft 122. A pivot axle opening 62 defined in each blade is mounted over a mounting post 48 so that the mounting post acts as an axle for the blade. The blades are secured to the exterior of hub 40 via the mounting posts while remaining operable to pivot. In the illustrated embodiment, the mounting posts have a smooth cylindrical portion with a thickness approximately matching the thickness of the blades, with threaded portions extending beyond each blade. A locknut 78 can be secured to each mounting post to retain the blades on the mounting posts. Alternately, other connection methods or fasteners can be used to pivotally mount the blades to a hub.

Each blade 60 is roughly triangular in shape, and includes an outward cutting edge 64. Typically the outward cutting edge is the primary cutting edge and is sharpened to cut a target such as an animal. Each blade further includes a forward or impact edge 66. Each blade 60 further includes an inward edge. The inward edge includes a central camming portion 70. Rearward of portion 70 is a retention notch 72. Forward of portion 70 is a locking notch 74. Each blade may also define a biasing notch 76 adjacent the forward end of the inward edge.

Figure 2:
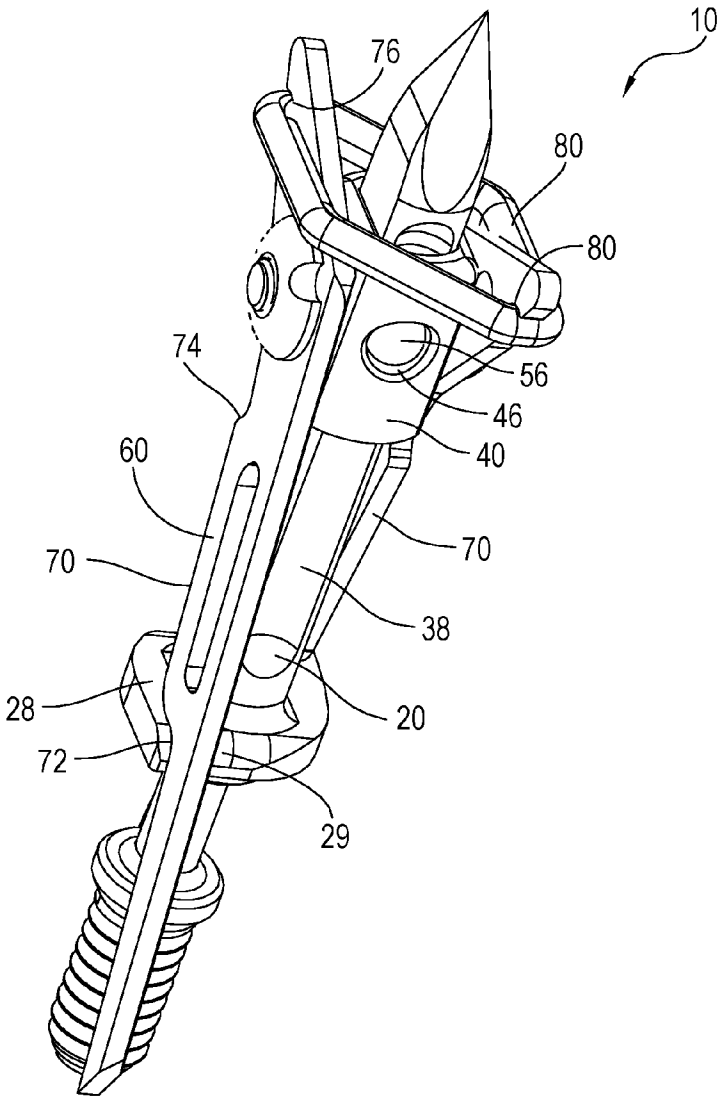
FIG. 2 is a perspective view of the broadhead of FIG. 1
Figure 3:
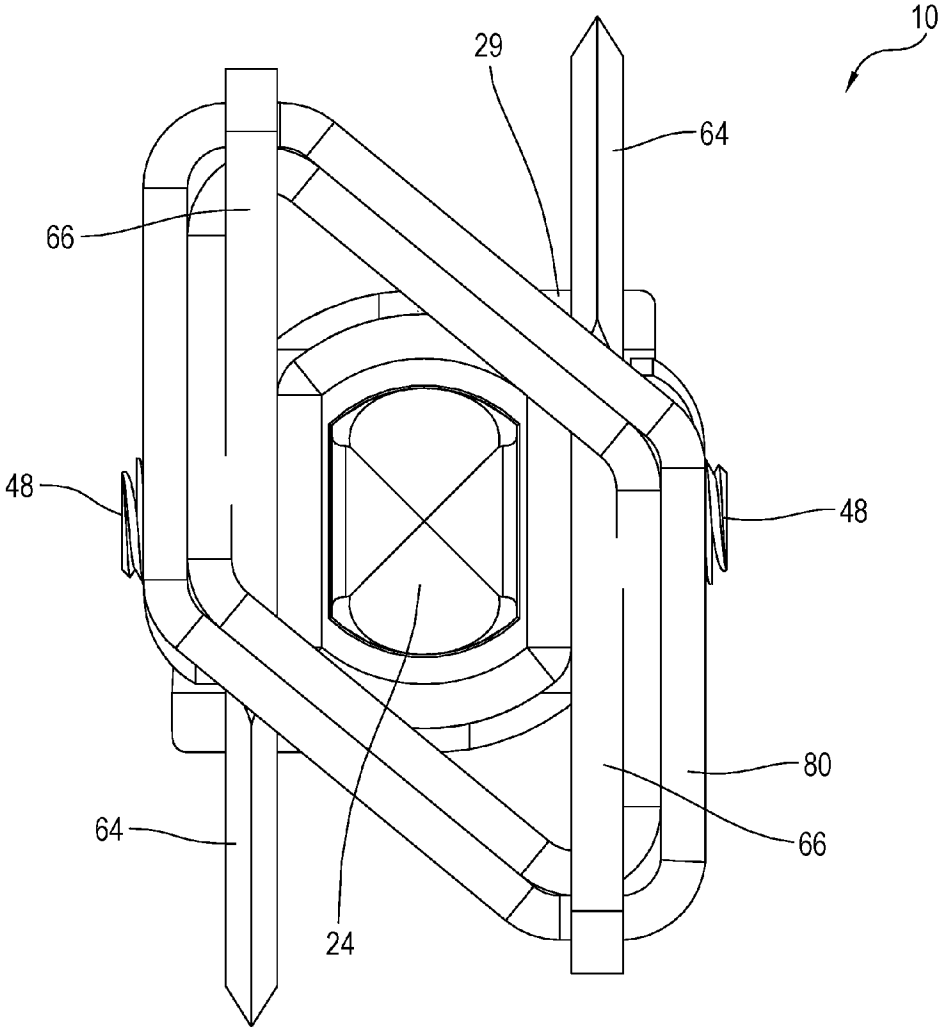
FIG. 3 is a front view of the broadhead of FIG. 1.
Figure 4:
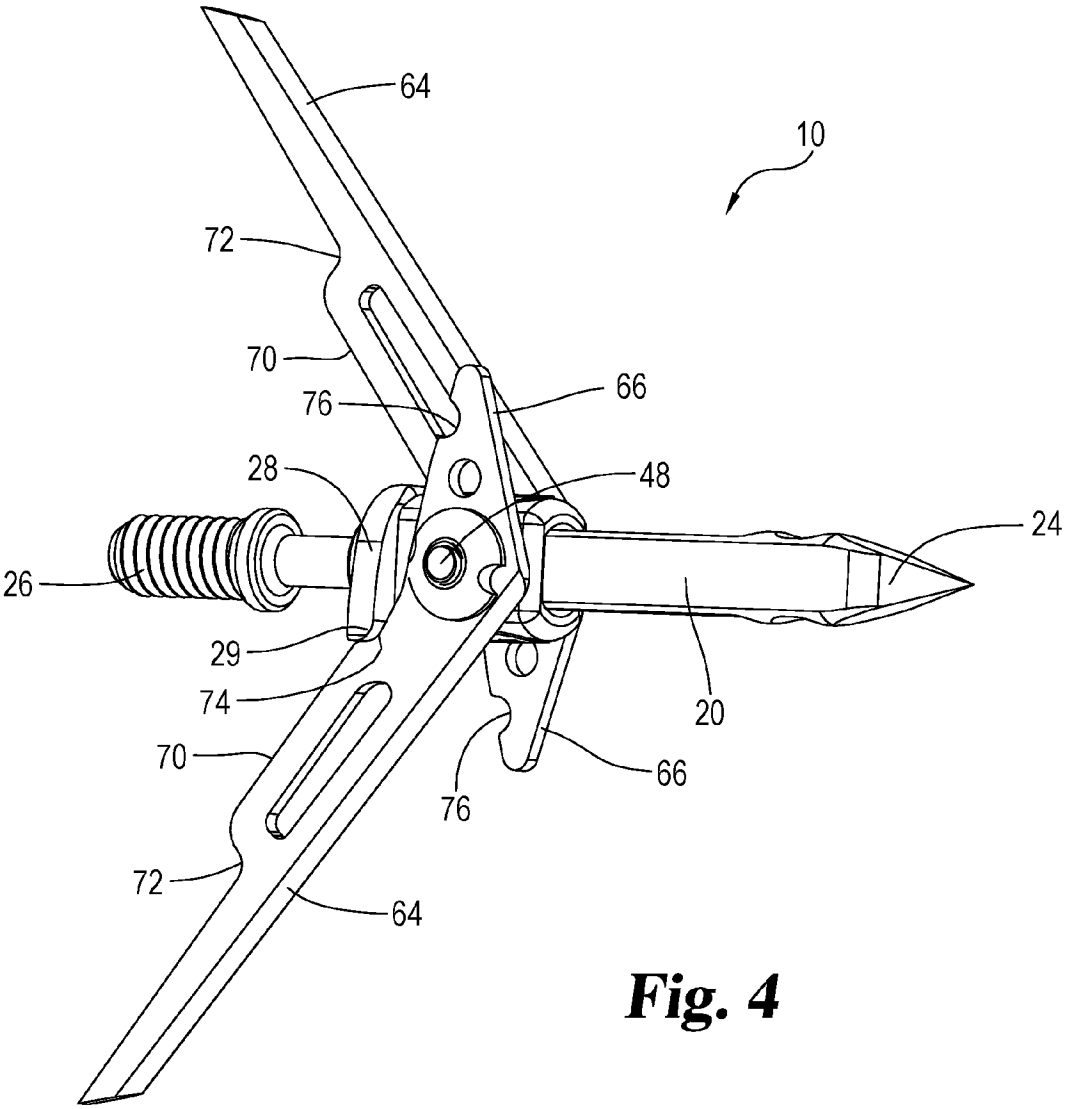
FIG. 4 is a side view of the broadhead of FIG. 1 in an open position.
Figure 5:
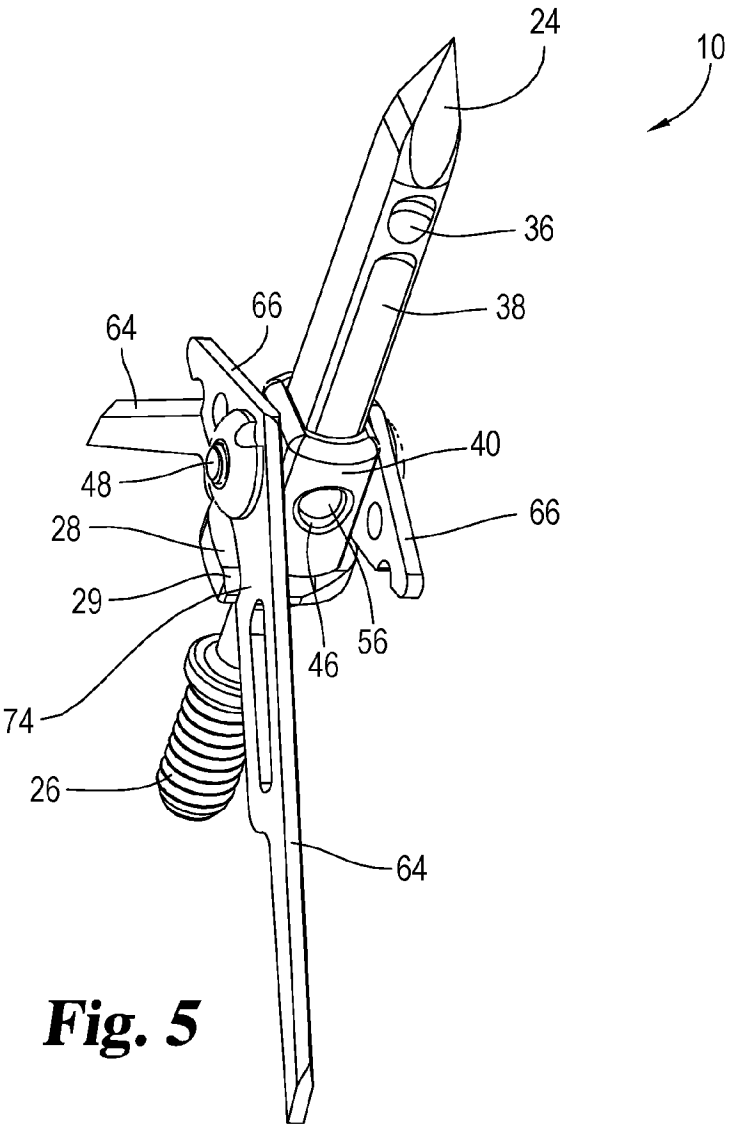
FIG. 5 is a perspective view of the broadhead of FIG. 1 in an open position.
Figure 6:
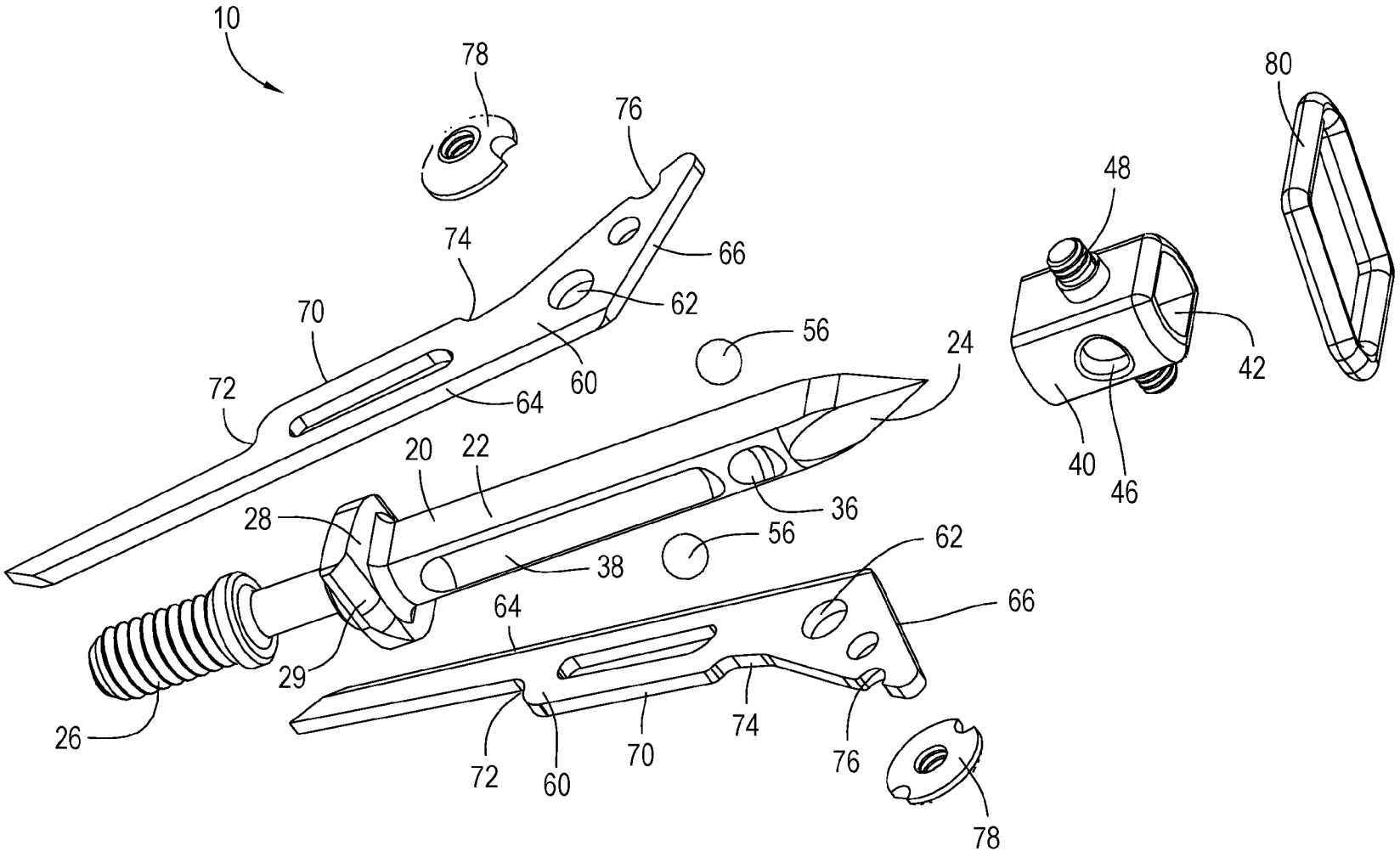
FIG. 6 is an exploded view of the broadhead of FIG. 1.

FIGS. 1-3 specifically illustrate broadhead 10 in a closed configuration. In the closed position, hub 40 is at its forwardmost position, adjacent to tip 24. In the closed position, the length of blades 60 is close to parallel to shaft 22. The retention notch 72 of each blade abuts a forward face of shelf 28. A biasing element 80 is located in the biasing notches 76 of the respective blades. Non-limiting examples of suitable biasing elements include an elastic band, an isomeric band, an o-ring, a torsion spring, a flat spring, a compression spring, shrink tubing, and a frangible rigid polymer band.

The biasing element typically applies pressure to bias or urge the forward ends of the inward edges towards each other and tip 24. The pivot axes of the blades cause the blades to operate in a bell-crank type lever arrangement, so that pressure urging the forward ends of the inward edges to rotate towards the tip, correspondingly urges the rearward portions, including camming portion 70, to rotate in the opposite direction. For purposes of illustration, as applied to the blade illustrated in the foreground of FIG. 1, biasing element 80 urges blade 60 to rotate clockwise. This urges the forward portion of blade 60 to rotate downward (in the illustrated perspective) around mounting post 48 towards tip 24, while the retention notch 72 is urged to rotate upward towards shelf 28. The urging assists the retention notch to secure the blade on shelf 28 and to prevent rearward movement or radial expansion of the blades prior to launch, during launch and during flight of the broadhead with an arrow. Concurrently, retaining balls 56 are engaged between recesses 36 and openings 46 and resist rearward movement of hub 40 and blades 60 prior to launch, during launch and during flight of the broadhead with an arrow.

When used with a bow and arrow, the broadhead may be fired at a target. During storage, prior to launch, and in flight prior to impact, the broadhead 10 preferably remains in the closed position as shown in FIGS. 1-2, preferably having aerodynamic properties. For example, an arrow equipped with a broadhead in the closed position may approximate the flight characteristics of a field point. As illustrated with a front view in FIG. 3, the tip 24 and impact edges 66 of the blades define impact surfaces when the broadhead strikes a target. The tip 24 initially impacts a target and begins to penetrate directly or less preferably with a glancing blow. As the tip enters the target, the target surface moves along and around the tip and then impacts the surfaces of the leading edges 66 of the respective blades. The contact of the target surface with the leading edges 66 creates resistance and applies rearward force to the leading edges. The target surface may also apply rearward force to forward portions of hub 40, mounting posts 48 and locknuts 78. This initial impact causes an initial rotation of the blades, for example the blade in the foreground of FIG. 1 rotates counterclockwise, which causes retention notch to disengage from shelf 28 by rotating slightly radially outward over camming surface 29. This rotation may also break or dislodge retention member 80.

As the broadhead continues to travel forward, the target surface continues to apply rearward force to the hub and blade assembly. This causes the blades to continue to rotate while also causing the blades 60 and hub 40 to begin traveling rearward as an assembly relative to the shaft portion, overcoming the resistance of retaining balls 56. As hub 40 begins to translate rearward, the camming portion 70 of each blade is slidably pushed against the respective camming surface 29, assisting, via a camming or wedging force, the cutting edges 64 to radially rotate and expand outward. Each camming surface 29 may have an upper profile which is rounded or slanted to assist in forcing the camming portion 70 outward as the blades slide rearward.

Due to the mounting points on common hub 40, each blade is maintained at the same rearward/forward position with the other blades and accordingly the blades are balanced and synchronized in their rotation and movement. With the balanced assembly, the blades will rotate and open/deploy at the same rate even if the impact force is applied unevenly, for example due to a glancing impact between the broadhead and the target.

As the blades and hub 40 reach their rearwardmost position, the locking notches 74 of each blade engage a lower portion of the profile of the respective camming surfaces 29. The lower profile portions include a step or locking edge with a face which is substantially parallel to the axis of body 20, so that once locking notches 74 slide rearward past the upper portion of the camming surfaces, a locking edge engages each locking notch to prevent inward rotation, locking each blade in the deployed, fully expanded position. Expanded blades of the broadhead provide a larger cutting diameter and may increase hemorrhaging and bleeding when hunting. Increased bleed-out may provide a faster and more humane kill.

FIGS. 7-11 show views of an alternate embodiment of a broadhead generally designated 110. The broadhead 110 is adapted for mounting to an open end of a hollow arrow shaft. The broadhead 110 includes a body 120. Body 120 has a forward end with a pointed tip 124, and a rearward end 126 configured to be connected to an arrow shaft. As illustrated, rearward end 26 includes threads configured for pairing with threads inside of the arrow shaft. In other forms, broadhead 110 may be mounted to an arrow shaft in other ways, such as with mechanical fasteners, adhesives, resins, mounting on a ferrule or arrow shaft insert, or using other attachment techniques.

Broadhead body 120 includes a forward end 123. A tip 124 is attached to forward end 123. During assembly tip 124 can be emplaced to be retained on forward end 123, for example it can be secured with adhesive, a fastener, welding or brazing, a threaded engagement, a friction fit or a snap fit. Alternately tip 124, can be made as an integral piece with body 120. Typically, the tip 124 is tapered rearwardly and outwardly. The tip base may extend outward from or may merge with the profile of shaft 122. Shaft 122 preferably is formed with a non-circular cross-section, for example in the illustrated embodiment shaft 122 has a roughly triangular cross section with truncated corners.

A rearward portion of shaft 122 transitions into a shelf or ledge 128, extending outward from at least portions of the sides of shaft 122. Certain edges of shelf or ledge 128 may form rounded or sloped camming surfaces 129. A portion of body 120 extends rearward from shelf 128 to rearward end 126. Body 120 may be integrally made as a single piece. Alternately, body 120 may be assembled from one or more pieces secured together.

Hub 140 is slidably mounted on shaft 122 between tip 124 and shelf 128. Hub 140 may be operable to translate forward or rearward relative to shaft 122. Hub 140 defines an interior passage 142 with a cross-section sized and shaped to approximately match the cross-section of shaft 122. Hub 140 includes a plurality of external mounting posts 148, illustrated with three in the present embodiment, extending perpendicular to the longitudinal axis of shaft 122. Mounting posts 148 are arranged on separate sides of hub 140.

One or more cutting blades 160 are pivotally attached to the hub 140. The flat sides of each blade define a plane which is parallel to yet offset or angled so the plane does not intersect the longitudinal axis of shaft 122. In the illustrated embodiment, three blades 160 are pivotally mounted to hub 140. As illustrated, the planes of the three blades intersect in a triangular cross-section around the longitudinal axis of shaft 122. In alternate embodiments, four or more mounting posts and blades may be used, subject to sufficient spacing based on the size of the broadhead.

A pivot axle opening 162 defined in each blade is mounted over a mounting post 148 so that the mounting post acts as an axle for the blade. The blades are pivotally secured to the exterior of hub 140 via the mounting posts. In the illustrated embodiment, the mounting posts have a smooth cylindrical portion with a thickness approximately matching the thickness of the blades, with threaded portions extending beyond each blade. A locknut 178 can be secured to each mounting post to retain the blades on the mounting posts. Alternately, other connection methods can be used to pivotally mount the blades to a hub.

Each blade 160 is roughly triangular in shape, and includes an outward cutting edge 164. Typically the cutting edge is sharpened to cut a target such as an animal. Each blade further includes a leading forward or impact edge 166. Each blade 160 further includes an inward edge. The inward edge includes a central camming portion 170. Rearward of portion 170 is a retention notch 172. Forward of portion 170 is a locking notch 174. Each blade may also define a biasing notch 176 adjacent the forward end of the inward edge.

Figure 7:
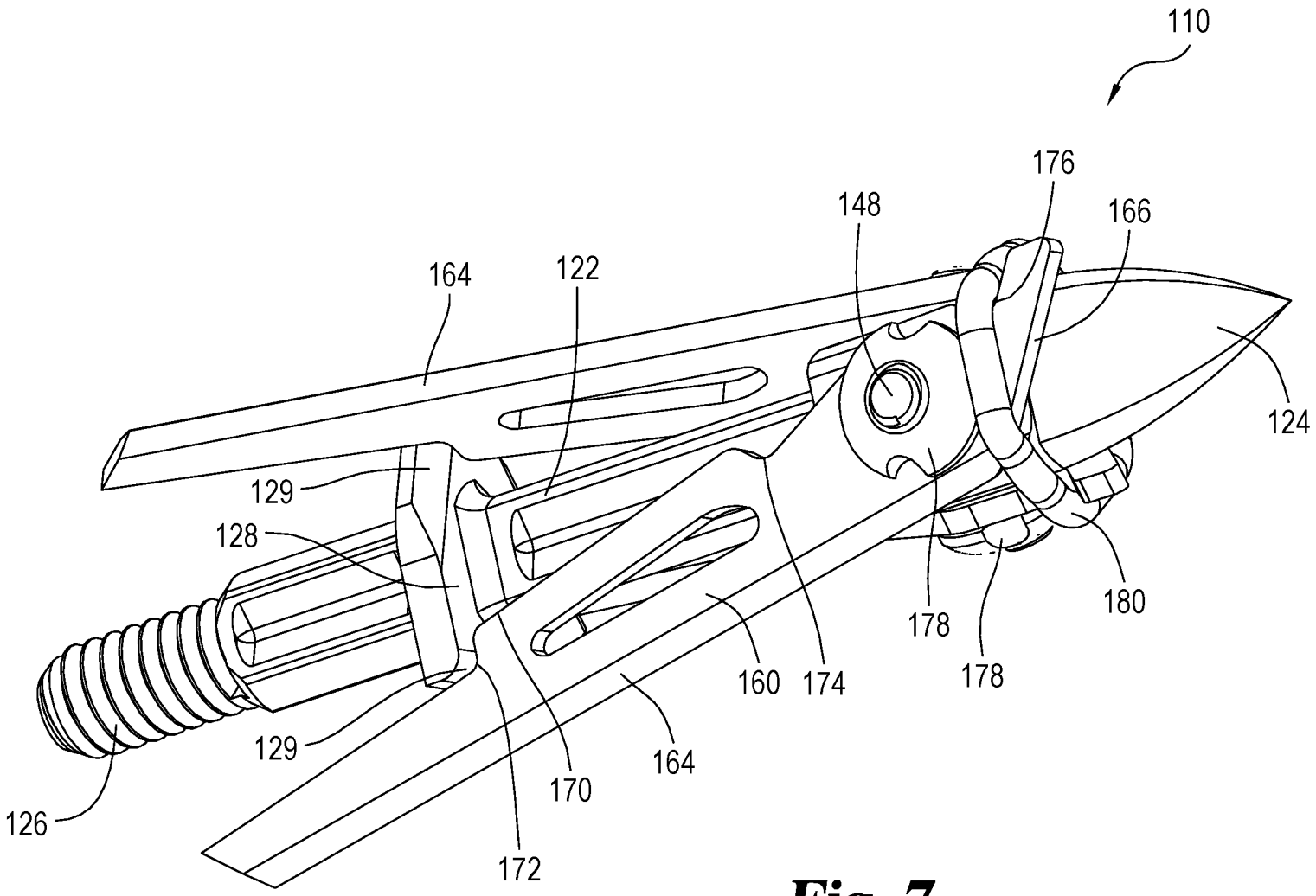
FIG. 7 is a perspective view of an alternate embodiment of a mechanical broadhead in a closed position.
Figure 8:
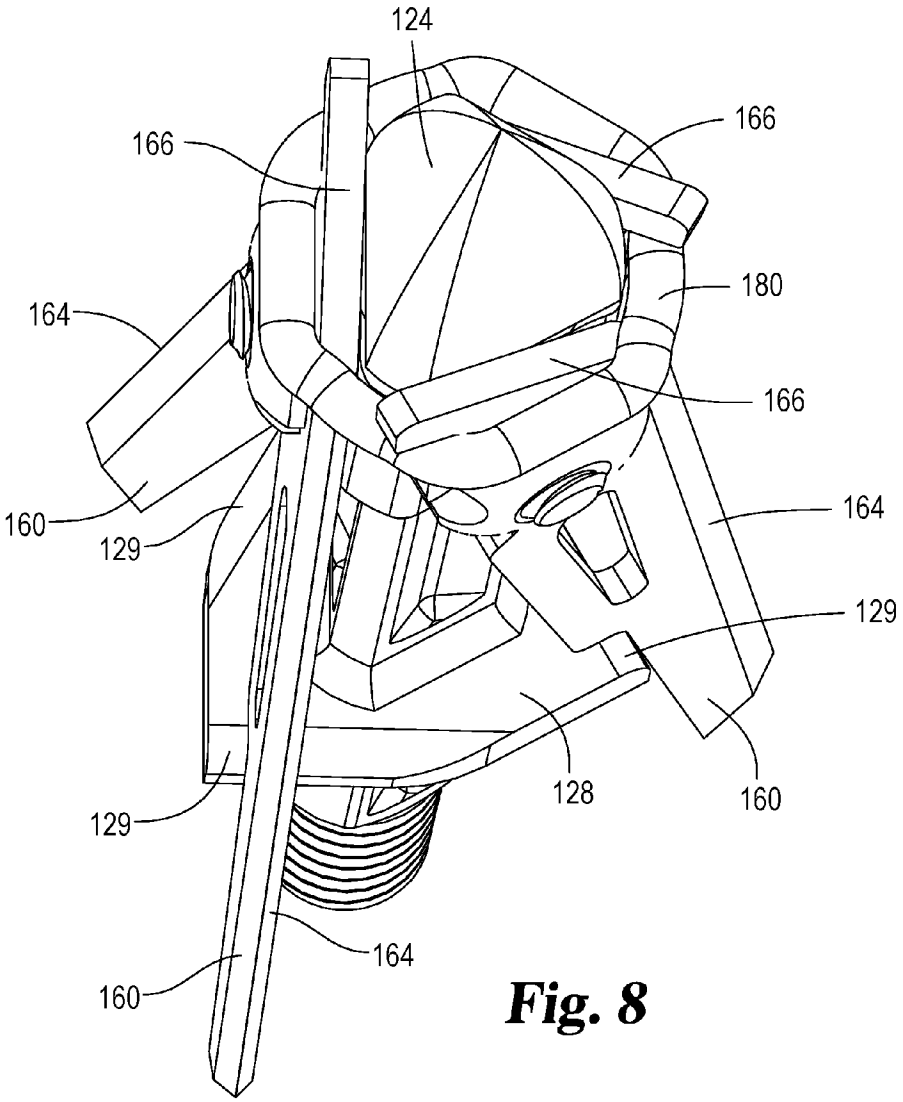
FIG. 8 is a front perspective view of the broadhead of FIG. 7
Figure 9:
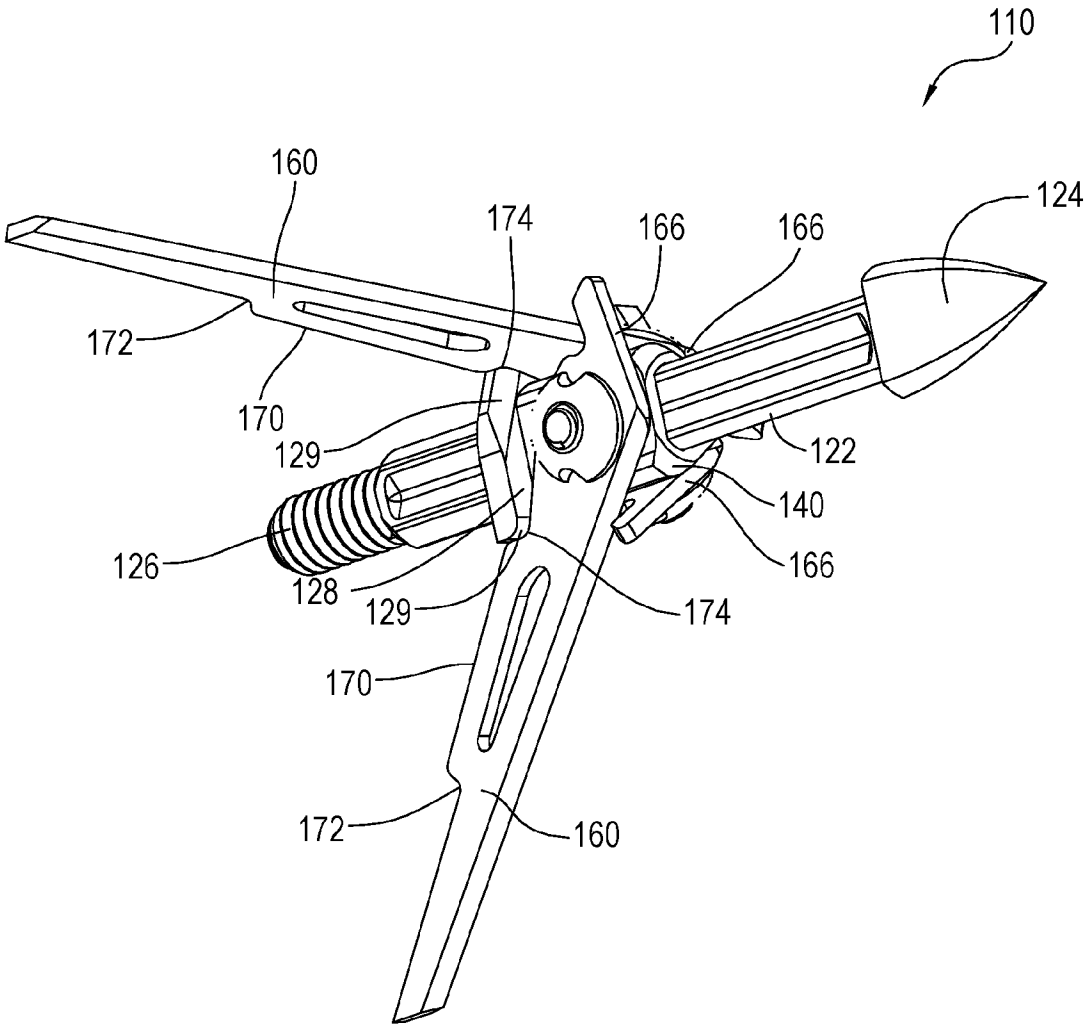
FIG. 9 is a perspective view of the broadhead of FIG. 7 in an open position.
Figure 10:
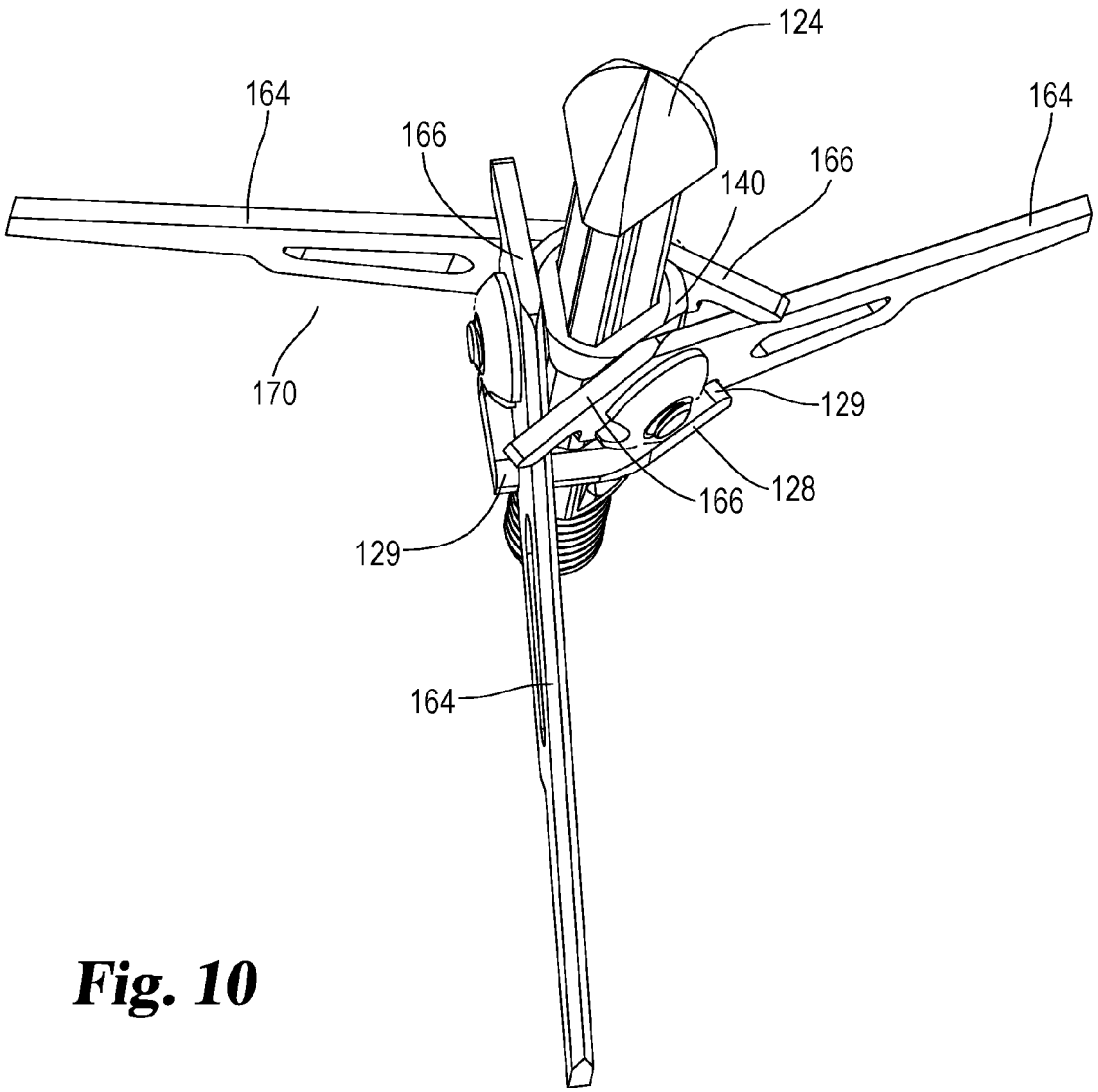
FIG. 10 is a front perspective view of the broadhead of FIG. 7 in an open position.
Figure 11:
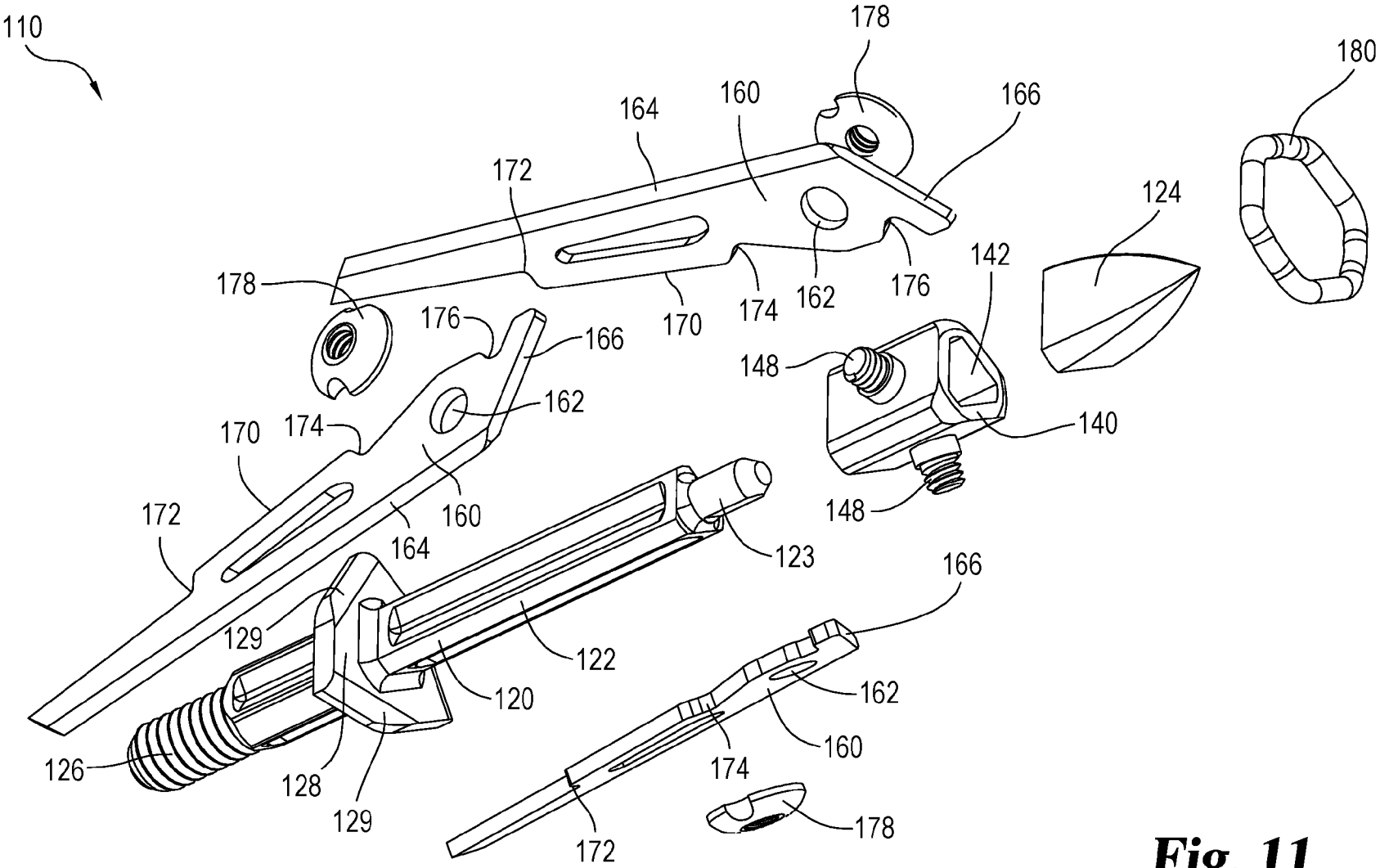
FIG. 11 is an exploded view of the broadhead of FIG. 1.

FIGS. 7-8 specifically illustrate broadhead 110 in a closed configuration. In the closed position, hub 140 is at its forwardmost position, adjacent to tip 124. In the closed position, the length of blades 160 is close to parallel to shaft 122. The retention notch 172 of each blade abuts a forward face of shelf 128. A retaining element 180 is located in the biasing notches 176 of the respective blades. Non-limiting examples of suitable retaining elements include an elastic band, an isomeric band, an o-ring, a torsion spring, a flat spring, a compression spring, shrink tubing, and a frangible rigid polymer band.

The retaining element typically applies pressure to bias or urge the forward ends of the inward edges towards each other and tip 124. The pivot axes of the blades cause the blades to operate in a bell-crank type lever arrangement, so that pressure urging the forward ends of the inward edges to rotate towards the tip, correspondingly urges the rearward portions, including camming portion 170, to rotate in the opposite direction. For purposes of illustration, as applied to the blade illustrated in the foreground of FIG. 7, retaining element 180 urges blade 160 to rotate clockwise. This urges the forward portion of blade 160 to rotate downward (in the illustrated perspective) around mounting post 148 towards tip 124, while the retention notch 172 is urged to rotate upward towards shelf 128. The urging assists the retention notch to secure the blade on shelf 128 and to prevent rearward movement or radial expansion of the blades prior to launch, during launch and during flight of the broadhead with an arrow.

When used with a bow and arrow, the broadhead may be fired at a target. In flight, the broadhead 110 preferably remains in the closed position as shown in FIGS. 7-8, preferably having aerodynamic properties. For example, an arrow equipped with a broadhead in the closed position may approximate the flight characteristics of a field point. As illustrated with a front view in FIG. 8, the tip 124 and impact edges 166 of the blades define impact surfaces when the broadhead strikes a target. The tip 124 initially impacts a target and begins to penetrate directly or less preferably with a glancing blow. As the tip enters the target, the target surface moves along and around the tip and then impacts the leading edges 166 of the respective blades. The contact of the target surface with the leading edges 166 creates resistance and applies rearward force to the leading edges. The target surface may also apply rearward force to forward portions of hub 140, mounting posts 148 and locknuts 178. This initial impact causes an initial rotation of the blades, for example the blade in the foreground of FIG. 7 rotates counterclockwise, which causes retention notch to disengage from shelf 128 by rotating slightly radially outward over camming surface 129. This rotation may also break or dislodge retaining element 180.

As the broadhead continues to travel forward, the target surface continues to apply rearward force to the hub and blade assembly. This causes the blades 160 and hub 140 to begin traveling rearward. As blades 160 and hub 140 begin to translate rearward, the central camming portion 170 of each blade is slidably pushed against a rounded or sloped profile of the respective camming surface 129. The profiles of the camming surfaces 129 force the blades outward as they slide rearward, causing the cutting edges 164 to rotate and expand outward.

Due to the mounting points on common hub 140, each blade is maintained at the same rearward/forward position with the other blades and accordingly the blades are balanced and synchronized in their rotation and movement. With the balanced assembly, the blades will rotate and open/deploy at the same rate even if the impact force is applied unevenly, for example due to a glancing impact between the broadhead and the target.

As the blades and hub 140 reach their rearwardmost position, the locking notches 174 of each blade slide past and engage locking edges of the respective camming surfaces 129, preventing the blades from rotating inward and locking each blade in the deployed, fully expanded position. The locking edges are formed with face portions which are parallel to and abut portions of the locking notches when the blades are in the open position.

The bodies, tips, blades and hubs of the present embodiments can be made from metal materials for strength and durability, for example, iron, steel, stainless steel, aluminum or titanium. Alternately, other conventional materials having appropriate strength, durability and weight characteristics such as certain composite, plastic or glass materials may be used. Optionally, certain components may include openings or grooves to reduce the amount of metal used, correspondingly reducing the broadhead's mass and weight.

Figure 12:
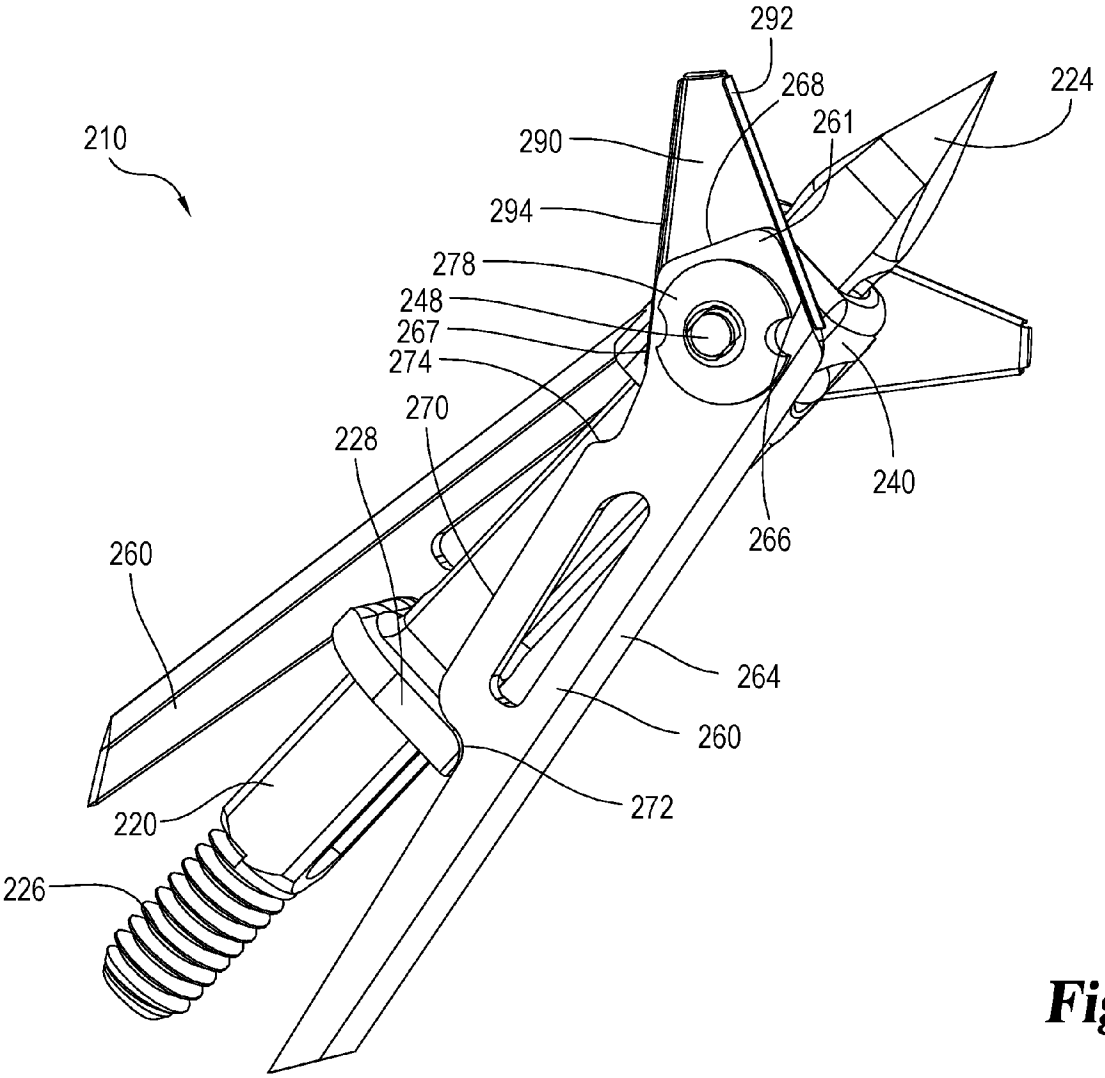
FIG. 12 is a perspective view of an alternate embodiment of a mechanical broadhead in a closed position.
Figure 13:
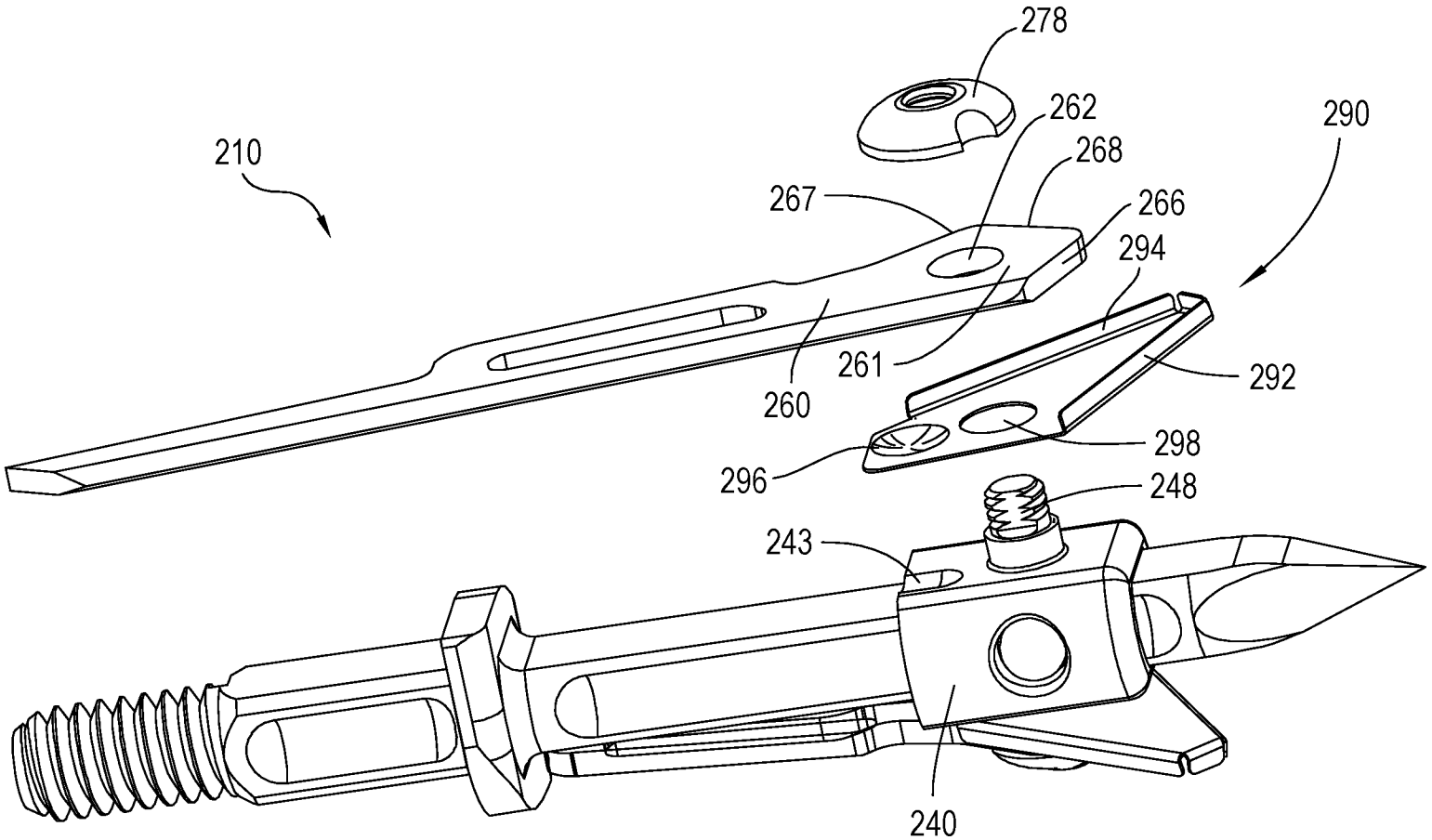
FIG. 13 is a partially exploded view of the broadhead of FIG. 12.

FIGS. 12-13 show views of an alternate embodiment of a broadhead generally designated 210. Except as discussed herein, the structure and function of broadhead 210 is the same as or comparable to broadhead 10. Broadhead 210 includes a body 220 with a pointed tip 224, and a rearward end 226 configured to be connected to an arrow shaft. A rearward portion of body 220 includes a shelf or ledge 228 which may form camming surfaces.

Hub 240 is slidably mounted on body 220. Hub 240 is operable to translate forward or rearward relative to the shaft portion of body 220. Optionally in this embodiment, a pair of retaining balls are mounted between a pair of opposing internal sides of hub 240 and the shaft on opposing sides of the shaft. Portions of the retaining balls are partially received in openings defined in opposing sides of hub 240. When hub 240 is in its forward-most position, rearward of tip 224, portions of the retaining balls are received in recesses defined adjacent the forward end of the shaft. As hub 240 slides rearward during deployment, the retaining balls leave the forward recesses and transition partially into a pair of recessed grooves defined on opposing sides of the shaft. The recesses, openings and retaining balls are preferably sized with an interference fit to initially resist rearward movement of hub 240, yet when a sufficient rearward force is applied the hub begins sliding rearward.

One or more cutting blades 260 are pivotally attached to the exterior of hub 240. The flat sides of each blade define a plane which is parallel to yet offset or angled so the plane does not intersect the longitudinal axis of the shaft. In the illustrated embodiment, a pair of blades 260 are pivotally mounted to a pair of mounting posts 248 extending outward on opposing exterior sides of hub 240.

As illustrated, the planes of the two blades are parallel to each other and offset on opposing sides of the longitudinal axis of body 220. An upper end portion 261 of each blade defines a pivot opening 262 which is mounted over a mounting post 248 so that the mounting post acts as an axle for the blade. The blades are secured to the exterior of hub 240 via the mounting posts while remaining operable to pivot. In the illustrated embodiment, the mounting posts have a smooth cylindrical portion with a thickness approximately matching the thickness of the blades, with threaded portions extending beyond each blade. A locknut 278 can be secured to each mounting post to retain the blades on the mounting posts. Alternately, other connection methods or fasteners can be used to pivotally mount the blades to a hub.

Each blade 260 includes an outward cutting edge 264. Each blade 260 further includes an inward edge. The inward edge includes a central camming portion 270. Rearward of portion 270 is a retention notch 272. Forward of portion 270 is a locking notch 274.

The upper portion 261 of each blade 260 encircles hub 240 and defines a truncated upper area having three short side edges. This includes a forward edge 266, a rearward edge section 267, and a lateral edge 268.

Arranged between each blade 260 and hub 240 and extending forward is an activation arm 290. Each activation arm 290 is pivotally attached to the exterior of hub 240 around a mounting post 248. A portion of activation arm forward and to the side of mounting post 248 is formed roughly in the shape of a truncated triangle, with mounting post hole 298 being on the base edge of the triangle. A forward edge 292 forms an impact surface along one side of the triangle. The third side of the triangle is defined by a rearward edge 294. The shape of activation arm is not intended to be limiting and can be altered as desired. In the illustrated embodiment, forward edge 292 and rearward edge 294 are non-parallel.

A central area of activation arm 290 surrounds and engages the upper end portion 261 of blade 260. The inside surface of a portion of forward edge 292 abuts and engages the surface of blade forward edge 266. The inside surface of a portion of rearward edge 294 abuts and engages blade rearward edge section 267. The engagement between activation arm 290 and the blade upper end portion 261 rotationally locks the blade and activation arm together. Correspondingly, rotation of activation arm 290 will cause blade 260 to rotate and rotation of blade 260 will cause activation arm 290 to rotate.

As shown in the exploded view in FIG. 13, each activation arm 290 includes a retention feature which engages hub 240 to inhibit rotation of the activation arm and blade when the broadhead is in the closed position. The illustrated retention feature is a protrusion 296, for example in a domed or hemi-spherical shape, extended from the activation arm towards the hub. Correspondingly, hub 240 defines an indentation or cavity 243 which protrusion 296 extends into, and into which protrusion 296 is received, when the broadhead is in the closed position. The extension of protrusion 296 into indentation 243 forms a friction fit which resists rotation of the activation arm. The friction assists the retention notch 272 to secure the blade on shelf 228 and to prevent rearward movement or radial expansion of the blades prior to launch.

FIGS. 12-13 specifically illustrate broadhead 210 in a closed configuration. In the closed position, hub 240 is at its forwardmost position, adjacent to tip 224. The retention notch 272 of each blade abuts a forward face of shelf 228.

When used with a bow and arrow, the broadhead may be fired at a target. During storage, prior to launch, and in flight prior to impact, the broadhead 210 preferably remains in the closed position, preferably having aerodynamic properties. The impact edges 292 of the activation arms define impact surfaces when the broadhead strikes a target. The tip 224 initially impacts a target and begins to penetrate directly or less preferably with a glancing blow. As the tip enters the target, the target surface moves along and around the tip and then impacts the surfaces of the leading edges 292 of the activation arms. The contact of the target surface with the leading activation arm edges creates resistance and applies rearward and rotational force to the activation arms. The target surface may also apply rearward force to forward portions of hub 240, mounting posts 248 and locknuts 278. This initial impact causes an initial rotation of the activation arms, which in turn causes the blades to rotate, for example the blade in the foreground of FIG. 12 rotates counterclockwise, which causes retention notch 272 to disengage from shelf 228 by rotating slightly radially outward.

As the broadhead continues to travel forward, the target surface continues to apply rearward force to the hub and activation arms. This causes the blades to continue to rotate while also causing the blades 260 and hub 240 to begin traveling rearward as an assembly, overcoming the resistance of protrusion 296 and, if used, any retaining balls. As hub 240 begins to translate rearward, the camming portion 270 of each blade is slidably pushed against the respective camming surfaces, assisting, via a camming or wedging force, the cutting edges 264 to radially rotate and expand outward.

Due to the mounting points on common hub 240, each blade is maintained at the same rearward/forward position with the other blades and accordingly the blades are balanced and synchronized in their rotation and movement. With the balanced assembly, the blades will rotate and open/deploy at the same rate even if the impact force is applied unevenly, for example due to a glancing impact between the broadhead and the target.

Figure 14:
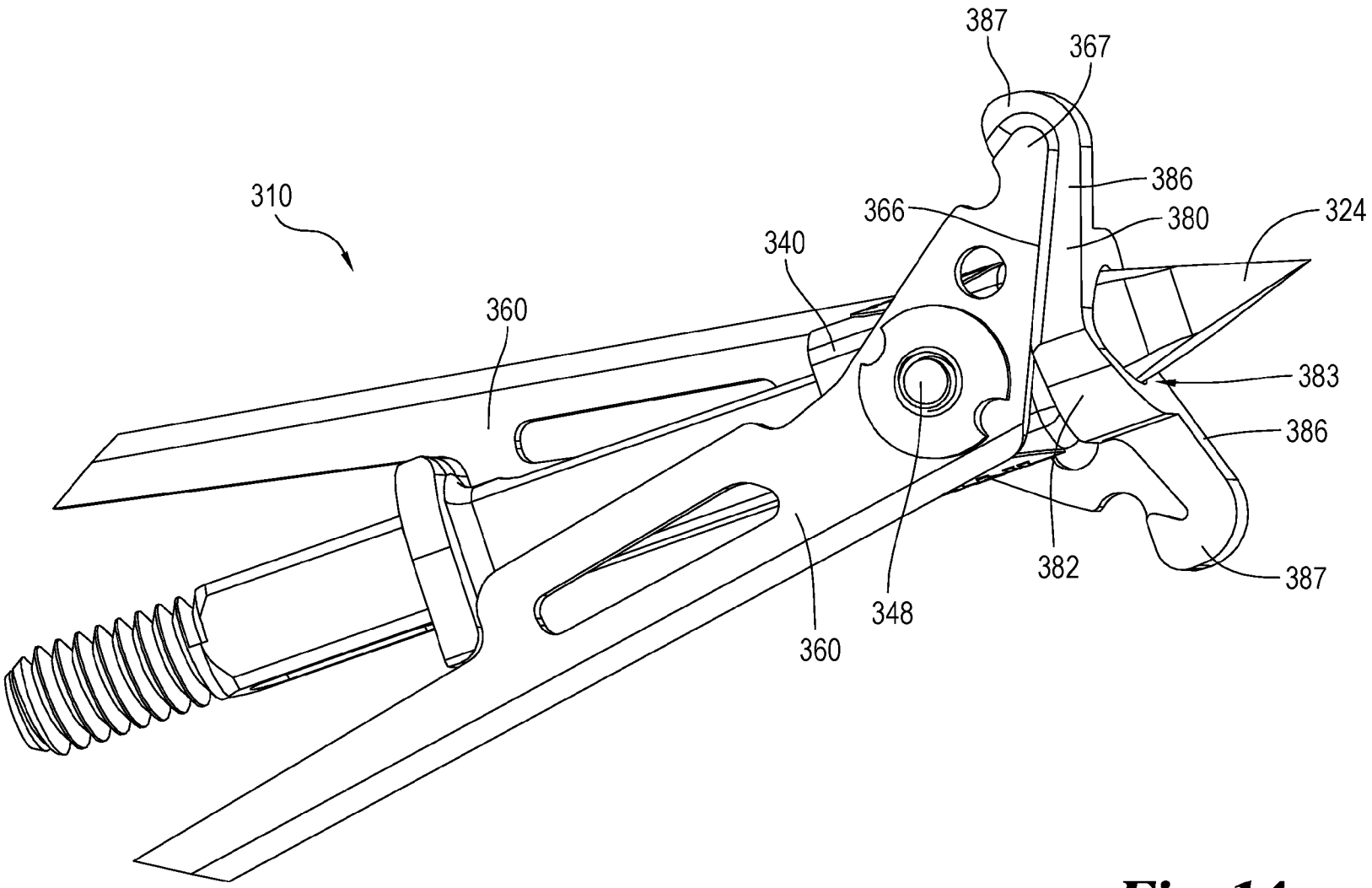
FIG. 14 is a perspective view of an alternate embodiment of a mechanical broadhead in a closed position.
Figure 15:
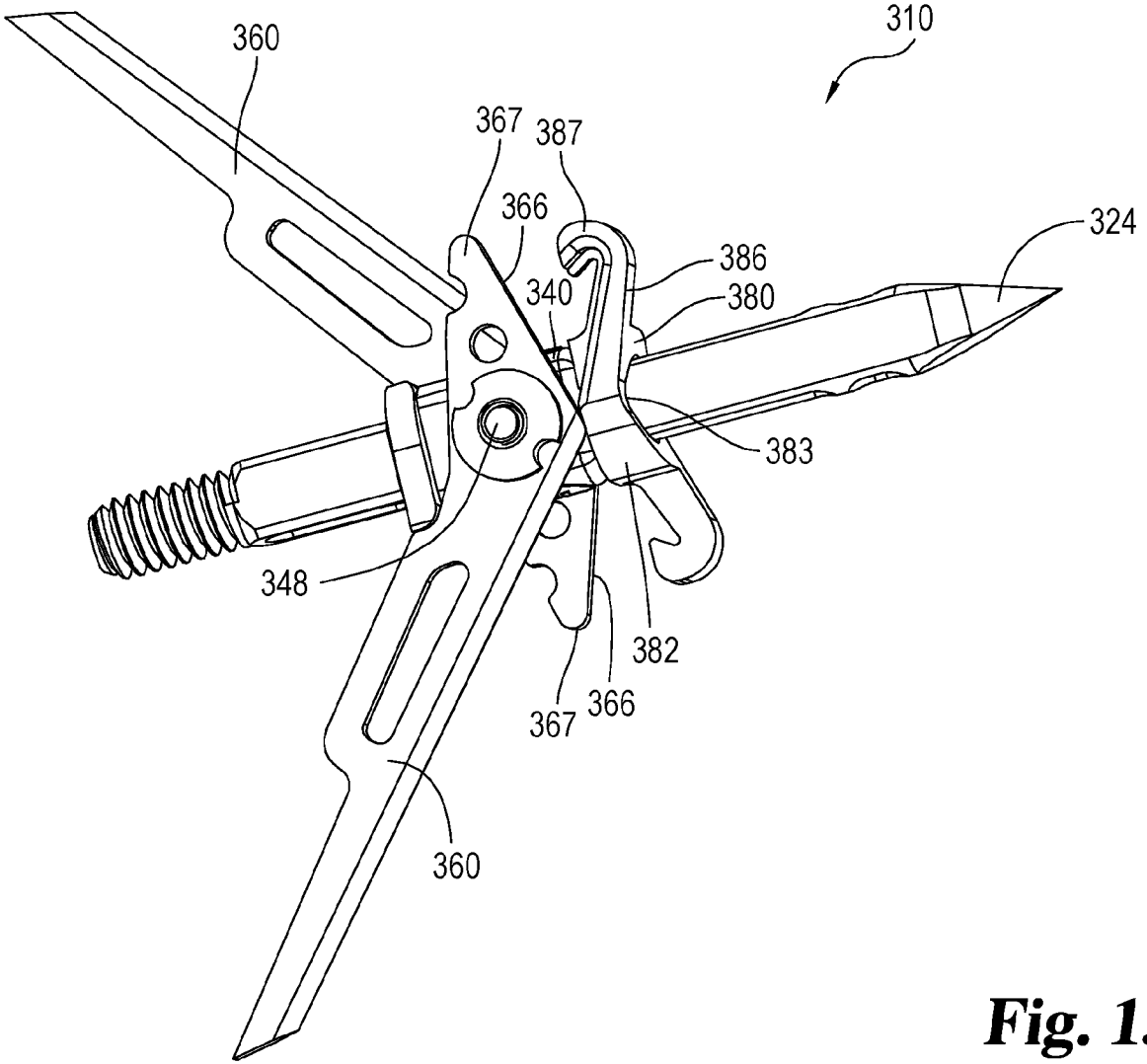
FIG. 15 is a side view of the broadhead of FIG. 14 in an open position.

FIGS. 14-15 show views of an alternate embodiment of a broadhead generally designated 310. Except as discussed herein, the structure and function of broadhead 310 is the same as or comparable to broadhead 10 and will not be fully repeated for brevity.

One or more cutting blades 360 are pivotally attached to the exterior of hub 340. The flat sides of each blade define a plane which is parallel to yet offset or angled so the plane does not intersect the longitudinal axis of the shaft. In the illustrated embodiment, a pair of blades 360 are pivotally mounted to a pair of mounting posts 348 extending outward on opposing exterior sides of hub 340.

As in broadhead 10, each blade 360 is roughly triangular in shape, and includes an outward cutting edge plus the inward edge which includes a central camming portion, a retention notch and a locking notch. Each blade further includes a leading forward edge 366 which extends to a leading tip or corner 367.

In certain embodiments, arranged forward of hub 340 and blades 360 is a deployment slider 380. In some alternate embodiments, slider 380 can be omitted. Deployment slider 380 includes a slider body or base portion 382 which defines an interior passage 383 with a cross-section sized and shaped to encircle and approximately match the cross-section of the tip and shaft of broadhead 310. Optionally, the cross-section of passage 383 prevents rotation of slider 380 with respect to the shaft. The rearward surface of slider body 382 abuts the forward surface of hub 340.

Slider 380 includes impact arms 386 which extend laterally from body 382 in front of each blade 360. Each impact arm 386 defines a forward facing impact edge or surface. The rearward face of each impact arm 386 defines a surface with a length and width sloped at an angle which covers and abuts a blade forward edge 366 when the broadhead is in the closed position. The rearward face of the impact arm may optionally define a slot or groove which receives the blade forward edge 366 in a nesting arrangement.

Impact arms 386 extend to outer ends 387. In the illustrated embodiment, outer ends 387 are each curved rearward. The rearward face of each outer end 387 receives and partially encircles a blade leading tip or corner 367. The rearward face of the outer ends 387 may optionally define a slot or groove which receives the blade tip 367 in a nesting arrangement.

Slider 380 engages blades 360 in the closed position of broadhead 310 to inhibit rotation of the blades prior to launch and during flight. Optionally, the slider may snugly engage the blade edges and encircle the tips in a snap-on type of action. In the closed arrangement, slider 380 may apply a neutral retaining force or an inward biasing force to blade tips 367 to retain the blades 360 in the closed position.

When used with a bow and arrow, broadhead 310 may be fired at a target. During storage, prior to launch, and in flight prior to impact, the broadhead 310 preferably remains in the closed position, preferably having aerodynamic properties. The impact edges 386 of the slider 380 define impact surfaces when the broadhead strikes a target. The tip 324 initially impacts a target and begins to penetrate directly or less preferably with a glancing blow. As the tip enters the target, the target surface moves along and around the tip and then impacts the surfaces 386 of slider 380. The contact of the target surface with the slider creates resistance and applies rearward force to the slider. The forwardly sloped impact arms 386 match the slope of the blade forward edges 366. Preferably the broadhead impact axis matches the longitudinal axis of the broadhead body and is at an acute angle to the slope of impact arms 386. The initial impact force pushes the impact arms rearward along the slopes of the blade leading edges, causing an initial rotational movement in blades 360. This causes an initial rotation of the blades to disengage the blade tips 367 from the outer ends 387 of slider 380.

As the broadhead continues to travel forward, the target surface continues to apply rearward force to the slider. This in turn applies rearward force to the hub 340 and hub assembly including blades 360. As hub 340 begins to translate rearward, the camming portion of each blade is slidably pushed against the respective camming surfaces, assisting, via a camming or wedging force, the cutting edges to radially rotate and expand outward.

Due to the mounting points on common hub 340, each blade is maintained at the same rearward/forward position with the other blades and accordingly the blades are balanced and synchronized in their rotation and movement. With the balanced assembly, the blades will rotate and open/deploy at the same rate even if the impact force is applied unevenly, for example due to a glancing impact between the broadhead and the target.

FIGS. 16-23 show views of an alternate embodiment of a broadhead generally designated 410. The broadhead 410 is adapted for mounting to an open end of a hollow arrow shaft. The broadhead 410 includes a body or ferrule 420. Body 420 has a forward end with a pointed tip 424, and a rearward end 426 configured to be connected to an arrow shaft. Optionally, rearward end 426 includes threads configured for pairing with threads inside of the arrow shaft. In other forms, broadhead 410 may be mounted to an arrow shaft in other ways, such as with mechanical fasteners, adhesives, resins, mounting on a ferrule or arrow shaft insert, or using other attachment techniques.

The forward end of broadhead body 420 includes tip 424. The tip 424 may be made integrally with or attached to a forward portion of a central shaft 422. Typically, the pointed tip 424 is tapered rearwardly and outwardly. The tip base may extend outward from or may merge with the profile of shaft 422. In certain embodiments, shaft 422 is formed with a non-circular cross-section, for example in the illustrated embodiment shaft 422 has a substantially square cross section.

In certain embodiments, a rearward portion of shaft 422 transitions into a shelf or ledge 428, extending radially outward from at least portions of the sides of shaft 422. Certain edges of shelf or ledge 428 may form camming surfaces 429. A portion of body 420 extends rearward from shelf 428 to rearward end 426. Body 420 made be made as a single piece. Alternately, body 420 may be assembled from one or more pieces secured together, such as a tip section which can be mounted to shaft 422.

Hub 440 is slidably mounted on shaft 422, for example between tip 424 and shelf 428. Hub 440 is operable to translate forward or rearward relative to shaft 422. Hub 440 defines an interior passage 442 with a cross-section sized and shaped to approximately match the cross-section of shaft 422 and which inhibits rotation of hub 440 with respect to shaft 422.

In the illustrated embodiment, at least one and optionally a pair of set screws or retaining pins 456 are mounted through a pair of openings 446 in opposing sides of hub 440 on opposing sides of shaft 422. Retaining pins 456 can be the same or similar to retaining pins 556 illustrated in FIGS. 29-30 and discussed hereafter. Retaining pins 456 may be press-fit or threadably engaged with openings 446. Inward ends of retaining pins 456 are advanced inward during assembly and received in elongated axial grooves or slots 438 on opposing sides of shaft 422. Retaining pins 456 may be selectively advanced into groove 438 a sufficient distance to prevent hub 440 from sliding off of shaft 422, yet allow hub 440 to freely translate along shaft 422 within a range defined by the axial length of grooves 438.

Hub 440 includes a pair of mounting posts 448 extending outward perpendicular to the longitudinal axis of shaft 422. Mounting posts 448 are arranged on opposing exterior sides of hub 440, typically on alternate sides from openings 446.

One or more cutting blades 460 are pivotally attached to the exterior of hub 440. There may be a plurality of cutting blades 460, which is intended to mean two or more. As illustrated, the flat sides of each blade define a plane which is parallel to yet offset or angled so the plane does not intersect the longitudinal central axis of shaft 422. In the illustrated embodiment, a pair of blades 460 are pivotally mounted to hub 440. As illustrated, the planes of the two blades are parallel to each other on opposing sides of the longitudinal axis of shaft 422. A pivot axle opening 462 defined in each blade is mounted over a mounting post 448 so that the mounting post acts as an axle for the blade. The blades are secured to the exterior of hub 440 via the mounting posts 448 while remaining operable to pivot. In the illustrated embodiment, the mounting posts have a smooth cylindrical portion with a thickness approximately matching the thickness of the blades, which may act as an axle for each blade. Threaded portions extend outward from the smooth portions and beyond each blade. A locknut 478 can be secured to each mounting post to retain the blades on the mounting posts. Alternately, other connection methods or fasteners can be used to pivotally mount the blades to a hub.

Each blade 460 is roughly triangular in shape, and includes an outward cutting edge 464. Typically the outward cutting edge is the primary cutting edge and is sharpened to cut a target such as an animal. Each blade further includes a forward or impact edge 466, optionally also having a sharpened edge. The impact edge 466 may extend to a blade leading tip or corner 467, defining a pivot control point. The offset length of the corner 467 from the pivot axle opening 462 defines a lever arm which may be used to control rotation of the blade, for example by initiating blade rotation when force is applied to impact edge 466. Each blade 460 further includes an inward edge. The inward edge includes a central camming portion 470. Rearward of portion 470 is a retention notch 472. Forward of portion 470 is a locking notch 474.

Figure 16:
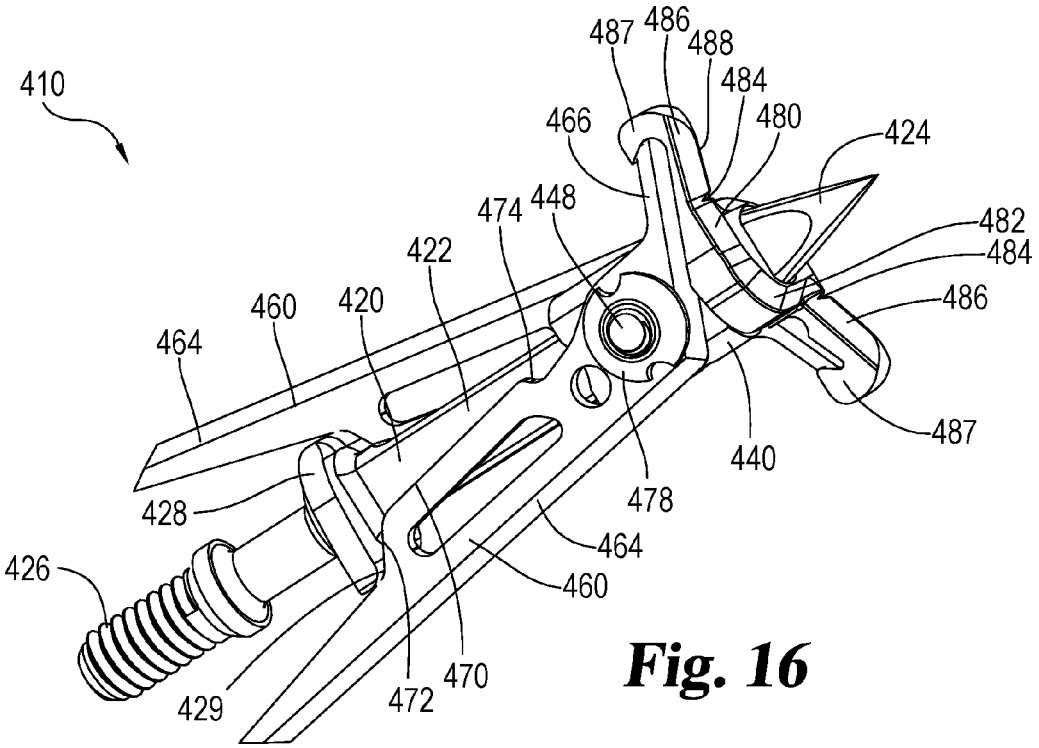
FIG. 16 is a perspective view of an alternate embodiment of a mechanical broadhead in a closed position.
Figure 17:
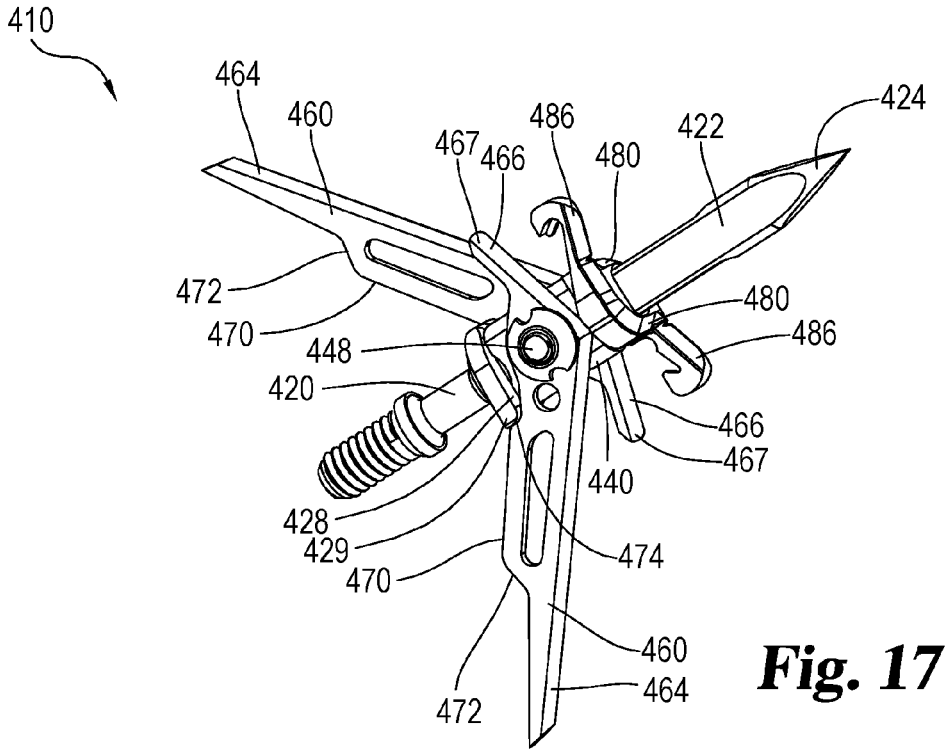
FIGS. 17-19 are views of the embodiment of FIG. 16 in an open position.
Figure 18:
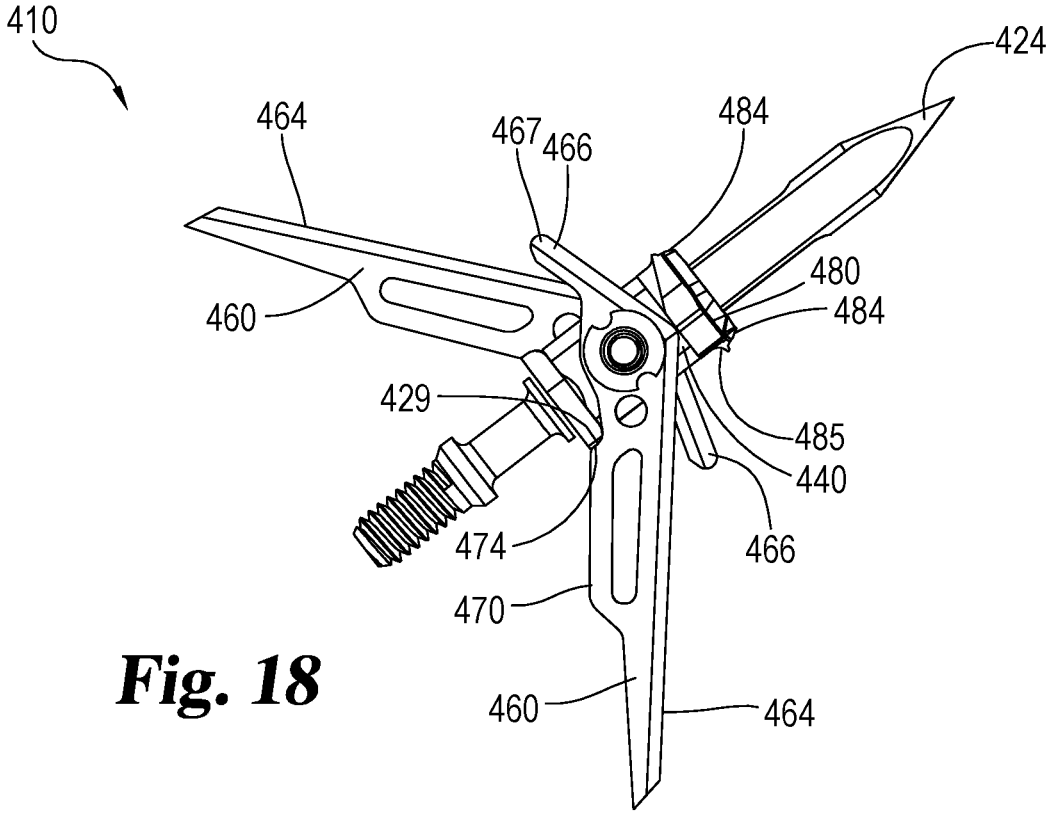

FIG. 16 illustrates broadhead 410 in a closed configuration. In the closed position, hub 440 is at its forwardmost position, adjacent to tip 424. In the closed position, the length of blades 460 is closer to parallel to shaft 422, for example forming an acute angle less than 45 degrees, and in many arrangements substantially less than 45 degrees. The retention notch 472 of each blade abuts a forward face of shelf 428. FIGS. 17-18 illustrate broadhead 410 in an open configuration. In the open position, hub 440 is at its rearwardmost position, adjacent to shelf 428. In the open position, the length of blades 460 diverges substantially from shaft 422 and are closer to perpendicular to shaft 422, forming an angle greater than 45 degrees.

In certain embodiments, arranged forward of the assembly with hub 440 and blades 460 is a deployment slider 480. In some alternate embodiments, slider 480 can be omitted. Deployment slider 480 includes a body or base portion 482 which defines an interior passage 483 with a cross-section sized and shaped to encircle and approximately match the cross-section of the tip and shaft of broadhead 410. Optionally, the cross-section of passage 483 inhibits rotation of slider 480 with respect to shaft 422. The rearward surface of base portion 482 abuts the forward surface of hub 440.

Figure 22:
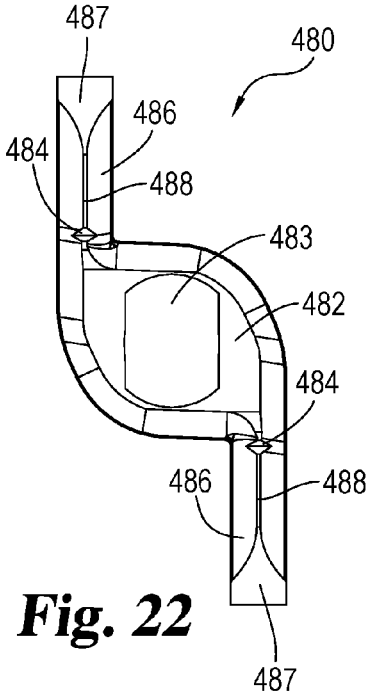
Figure 23:
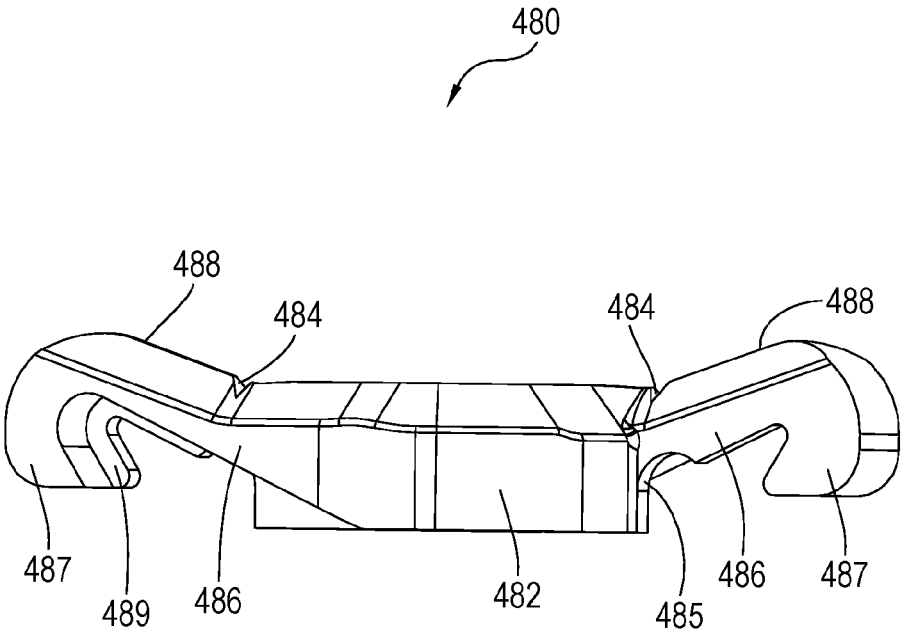

Slider 480 includes impact arms 486 which extend laterally in front of each blade 460. As illustrated in FIG. 22, a pair of impact arms 486 may be parallel and offset from each other. Each impact arm 486 defines a forward facing impact edge or surface 488. Optionally, each forward facing impact edge 488 may be sharpened to provide an additional cutting edge. The rearward face of each impact arm 486 defines a surface with a length, width and slope which matches, covers and abuts the forward edge 466 of one of the blades 460 when the broadhead is in the closed position. The rearward face of the impact arm 486 may optionally define a slot, groove or shelf 489 which receives the blade forward edge 466 in a nesting arrangement. In FIG. 23 the illustrated embodiment includes a rearward shelf 489 which forms an "L" shape with a rearward face to abut the front of edge 466, and a slight rearward extending flange or projection which extends parallel and partially adjacent a side of edge 466.

Impact arms 486 extend to outer ends 487. In the illustrated embodiment, outer ends 487 may be each curved rearward forming a hooked shape. The rearward face of each outer end 487 receives and partially encircles a blade leading tip or corner 467. The rearward face of the outer ends 487 may optionally define a slot or groove which receives the blade tip 467 in a nesting arrangement.

Slider 480 is engagable to retain blades 460 in the closed position to inhibit rotation of the blades prior to launch and during flight. Optionally, the slider may snugly engage the blade edges and encircle the tips in a snap-on type of action. The impact arms 486 are predominately rigid but may be slightly bent forward during engagement to allow the ends 487 to flex and "snap" around the respective blade tips 467. In the closed arrangement, slider 480 may apply a neutral retaining force or an inward biasing force to blade tips 467 to retain the blades 460 in the closed position.

Figure 19:
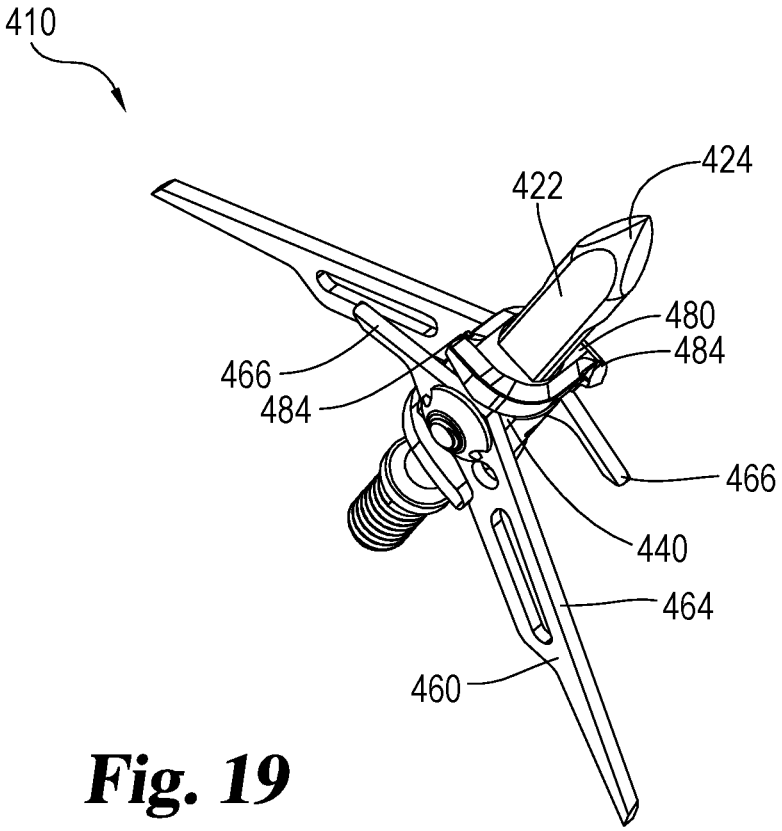
Figure 20:
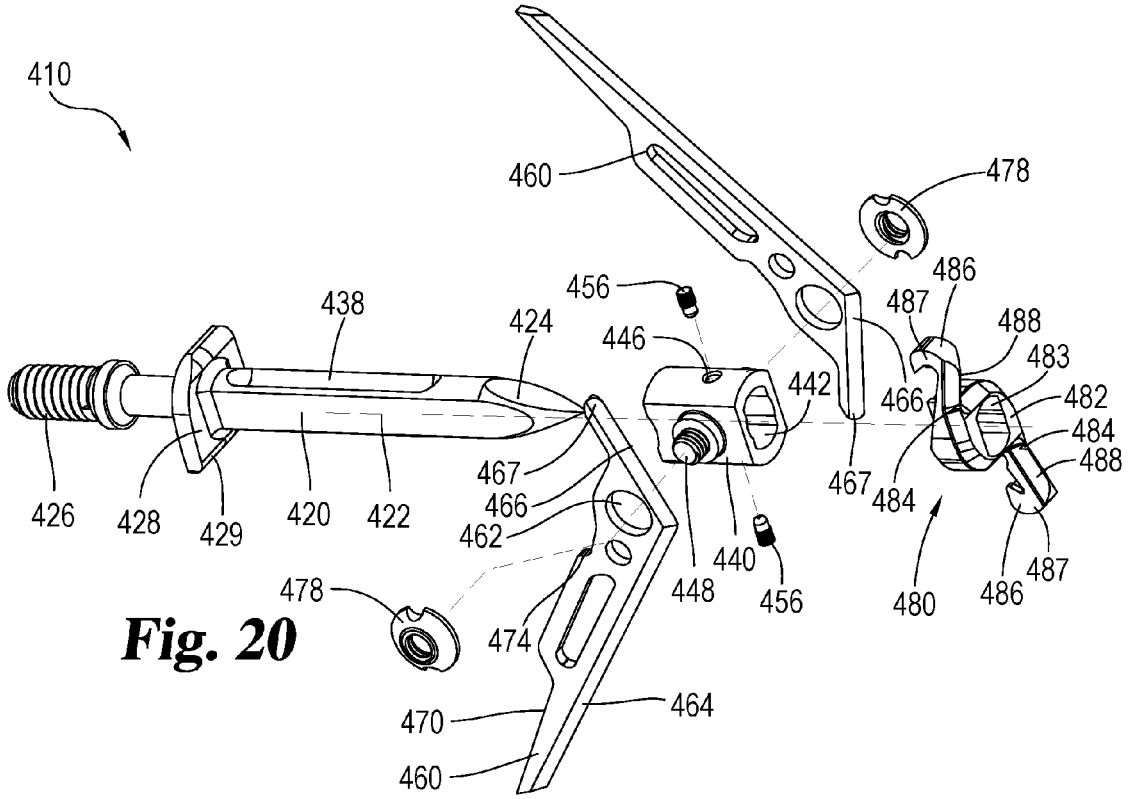
FIG. 20 is an exploded view of the broadhead of FIG. 16.
Figure 21:
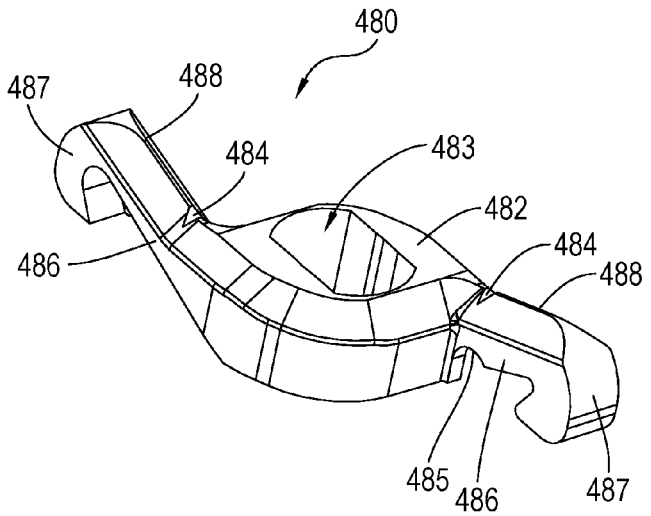
FIGS. 21-23 are views of the slider of the embodiment of FIG. 16

Detailed views of slider 480 are shown in FIGS. 21-23. Slider 480 may be made for multiple uses, or may be a disposable and replaceable component. In certain embodiments, arms 486 are intended to remain connected to body 482 during and after use. In certain other embodiments, arms 486 are designed to disconnect by breaking away from slider body 482 upon impact. FIGS. 18 and 19 illustrate slider 480 after the arms have broken away. In some embodiments, slider 480 defines breakaway notches between slider body 482 and each arm 486. Breakaway notches are, for example, an indented area forming a smaller cross-sectional area and thus define weak points in the slider. Upon impact, force transmitted along the slider will cause the impact arms to break-away from the slider body 482 at the notch as a defined breakage point. In some embodiments, forward breakaway notches 484 are defined inward along the upper edge or face at the junction between an impact arm 486 and slider body 482. Forward breakaway notches 484 may have a relatively narrow V-shaped profile in a channel across the impact arm. The forward facing notches may allow a slight forward flexing of the impact arms to allow the impact arms to engage and retain the blades, yet which facilitate break-away action of the impact arms when rearward impact force is applied. In some embodiments, rearward breakaway notches 485 are defined along the rearward edge or face at the junction between an impact arm 486 and slider body 482.

Slider 480 and other slider embodiments herein may be made from various materials, for example from plastic, polycarbonate, a semi-crystalline polyamide, a thermoplastic elastomer, acrylic, a resin material, a glass-filled nylon material or metal. In certain embodiments, the slider materials are chosen for high stiffness and strength to retain the blades during flight, yet with properties which are is sufficiently brittle upon impact to facilitate the break-away action of the impact arms when desired. In certain embodiments, the slider may be made from a transparent material. Alternately the slider can be made in various colors as desired.

When used with a bow and arrow, broadhead 410 may be fired at a target. During storage, prior to launch, and in flight prior to impact, the broadhead 410 preferably remains in the closed position, preferably having aerodynamic properties. The impact edges 486 of the slider 480 define impact surfaces when the broadhead strikes a target. The tip 424 initially impacts a target and begins to penetrate directly or less preferably with a glancing blow. As the tip enters the target, the target surface moves along and around the tip and then impacts the forward surfaces of the impact arms and body. The contact of the target surface with the slider creates resistance and applies rearward force to the slider. The initial impact force pushes the impact arms rearward along with the blade leading edges, causing an initial rotational movement in blades 460. This causes an initial rotation of the blades to unlock the blades, including disengaging the blade tips 467 from the outer ends 487 of slider 480. As part of this initial rotation, impact arms 486 may breakaway and disconnect from slider body 480.

As the broadhead continues to travel forward, the target surface continues to apply rearward force to the slider. This in turn applies rearward force to the hub assembly including hub 440 and blades 460. As hub 440 begins to translate rearward, the camming portion 470 of each blade is slidably pushed against the respective camming surfaces 429, assisting, via a camming or wedging force, the cutting edges to radially rotate and expand outward. Hub 440 translates rearward until it abuts shelf 428 while blades 460 expand outward. When hub 440 is in the rearward position, locking notches 474 of the blades engage shelf 428 to lock the blades in the expanded position. Due to the mounting points on common hub 440, each blade is maintained at the same rearward/forward position with the other blades.

If arms 486 have disconnected from slider body 482 during impact, only the slider body will remain on shaft 422, as shown in FIGS. 18 and 19. To reset broadhead 410 to the closed position, the hub and blade assembly is pulled forward relative to shaft 422. If slider 480 is reusable, the tips 467 of blades 460 are engaged with impact arms 486. Alternately, a remnant slider body 482 may be removed and a new slider 480 may be placed over tip 424 and situated to engage blades 460.

FIGS. 24-30 show views and components of an alternate embodiment of a broadhead generally designated 510. Except as discussed herein, the structure and function of broadhead 510 is the same as or comparable to broadhead 410 and will not be fully repeated for brevity. The primary difference between broadhead 410 and broadhead 510 is that broadhead 510 is a three-bladed version, with corresponding adaptations to the structure and components. The broadhead 510 includes a body or ferrule 520. Body 520 has a forward end with a pointed tip 524, and a rearward end 526 configured to be connected to an arrow shaft. In certain embodiments, shaft 522 is formed with a non-circular cross-section, for example in the illustrated embodiment shaft 522 has a substantially triangular cross-section with truncated corners. A rearward portion of shaft 522 may transition into a substantially perpendicular shelf or ledge 528, extending radially outward from at least portions of the sides of shaft 522. Certain edges of shelf or ledge 528 may form camming surfaces 529.

Hub 540 is slidably mounted on shaft 522. Hub 540 is operable to translate forward or rearward relative to shaft 522. Hub 540 defines an interior passage 542 with a cross-section sized and shaped to approximately match the cross-section of shaft 522 and which inhibits rotation of hub 540 with respect to shaft 522.

Figure 29:
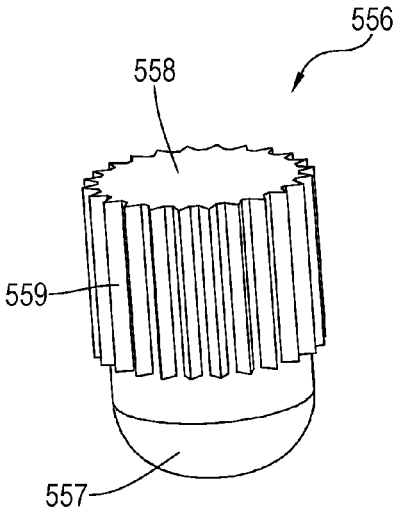
FIGS. 29-30 are views of a retaining pin used with the embodiments of FIGS. 16 and 24.
Figure 30:
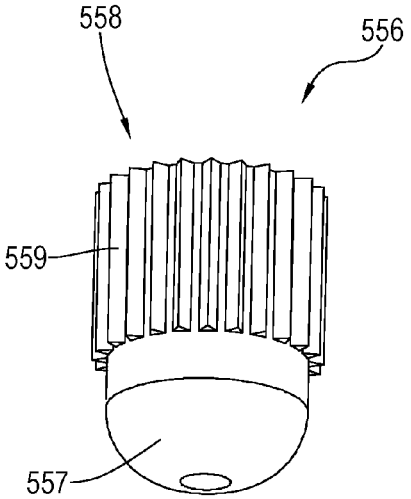

In the illustrated embodiment, one or more set screws or retaining pins 556 are mounted through openings 546 in the sides of hub 540 on corresponding sides of shaft 522. In optional embodiments, one pin may be used, two pins may be used, or a number of pins can be used. Retaining pins 556 may be pushed into position or alternately threadably engaged with the openings. An example retaining pin is illustrated in FIGS. 29-30. Inward ends 557 of retaining pin 556 are advanced inward during assembly and received in elongated axial grooves or slots 538 defined on sides of shaft 522. The outer ends 558 of the retaining pins may be used to push or tap each retaining pin into place. In the illustrated example, retaining pin 556 has splined cylindrical sides 559 which engage grooves in the hub opening.

Each retaining pin 556 may be selectively advanced to extend into a respective groove 538 a sufficient distance to prevent hub 540 from sliding off of shaft 522, yet allowing hub 540 to freely translate along shaft 522 within the range defined by the axial length of groove 538. While hub rotation is not generally desired, the width of groove 538 also defines a rotational tolerance of hub 540 and pin 556. Optionally, the inward end 557 extends inward and is received within the volume of a respective groove 538, but the inward end 557 does not need to contact the bottom or sides of the groove. In certain embodiments, inward end 557 is rounded, for example formed in a hemispherical shape. Optionally, the pin may be made with a slide facilitating material or a material to facilitate sliding motion may be placed between the pin inward end and the respective groove, for example a Delrin® or Teflon® material.

Hub 540 includes mounting posts 548 extending outward perpendicular to the longitudinal axis of shaft 522. Mounting posts 548 are arranged on exterior sides of hub 540.

One or more cutting blades 560 are pivotally attached to the exterior of hub 540. As illustrated, the flat sides of each blade define a plane which is parallel to yet offset or angled so the plane does not intersect the longitudinal central axis of shaft 522. In the illustrated embodiment, three blades 560 are pivotally mounted to hub 540. In other embodiments, two or four blades could potentially be used with correspondingly structural modifications. A pivot axle opening 562 defined in each blade is mounted over a mounting post 548 so that the mounting post acts as an axle for the blade. The blades are secured to the exterior of hub 540 via the mounting posts 548 while remaining operable to pivot. In the illustrated embodiment, the mounting posts have a smooth cylindrical portion with a thickness approximately matching the thickness of the blades, which may act as an axle for each blade. Threaded portions extend outward from the smooth portions and beyond each blade. A locknut 578 can be secured to each mounting post to retain the blades on the mounting posts. Alternately, other connection methods or fasteners can be used to pivotally mount the blades to a hub.

Each blade 560 is roughly triangular in shape, and includes an outward cutting edge 564. Typically the outward cutting edge is the primary sharpened edge to cut a target such as an animal. Each blade further includes a forward or impact edge 566. The impact edge 566 may extend to a blade leading tip or corner 567, defining a pivot control point. The offset length of the corner 567 from the pivot axle opening 562 defines a lever arm which may be used to control rotation of the blade, for example by force applied to impact edge 566. Each blade 560 further includes an inward edge. Optionally forward edge 566 may also be sharpened. The inward edge includes a central camming portion 570. Rearward of portion 570 is a retention notch 572. Forward of portion 570 is a locking notch.

Figure 24:
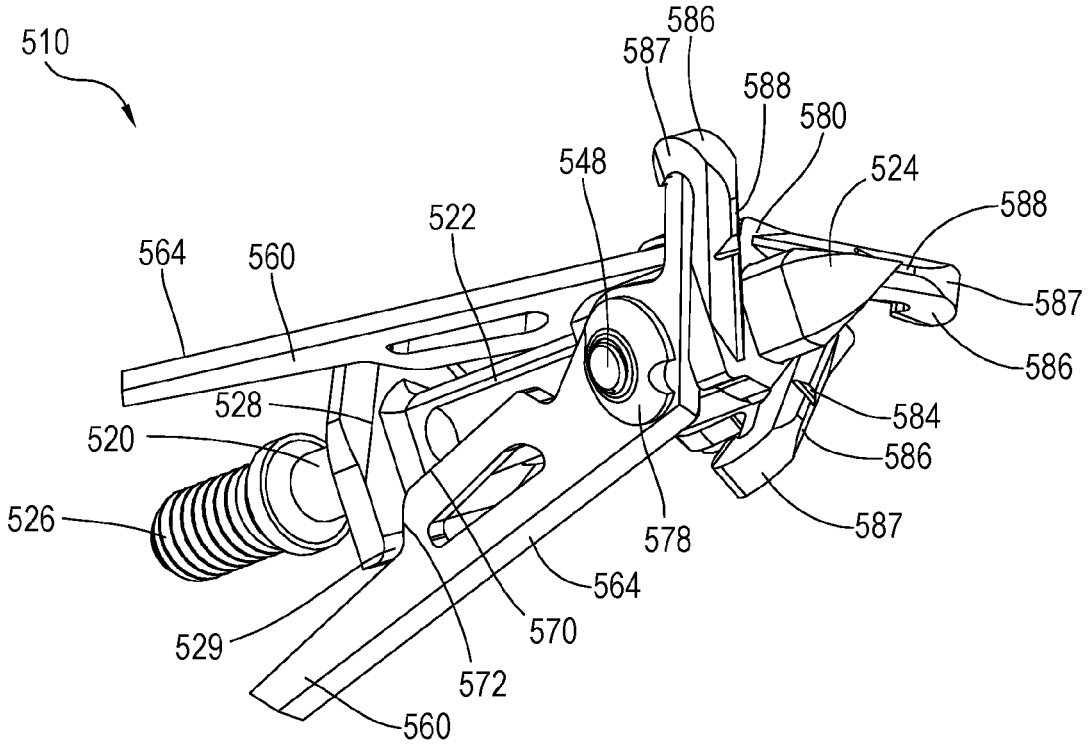
FIG. 24 is a perspective view of an alternate broadhead embodiment in a closed position.
Figure 25:
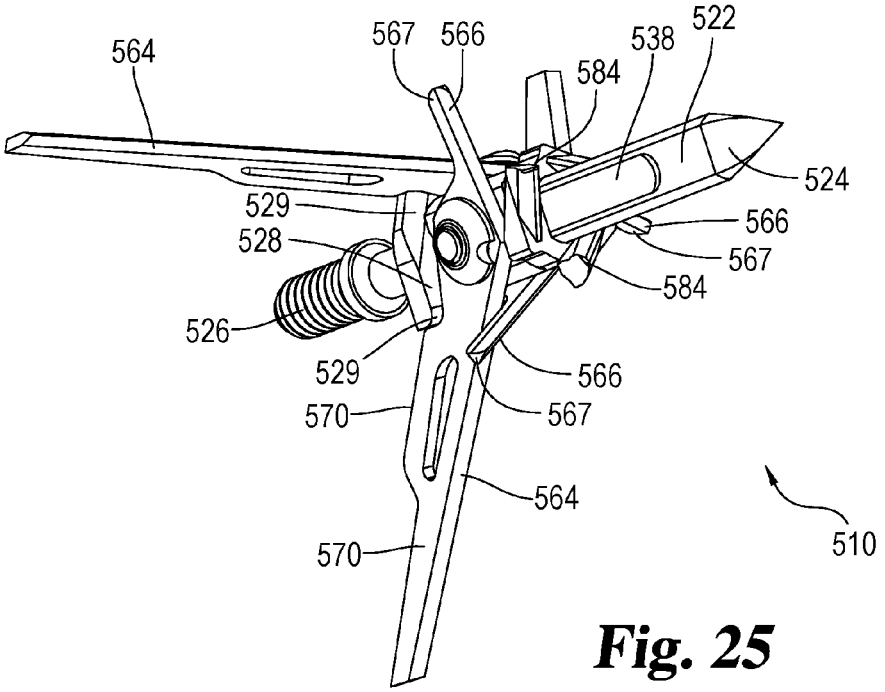
FIG. 25 is a view of the embodiment of FIG. 24 in an open position.
Figure 26:
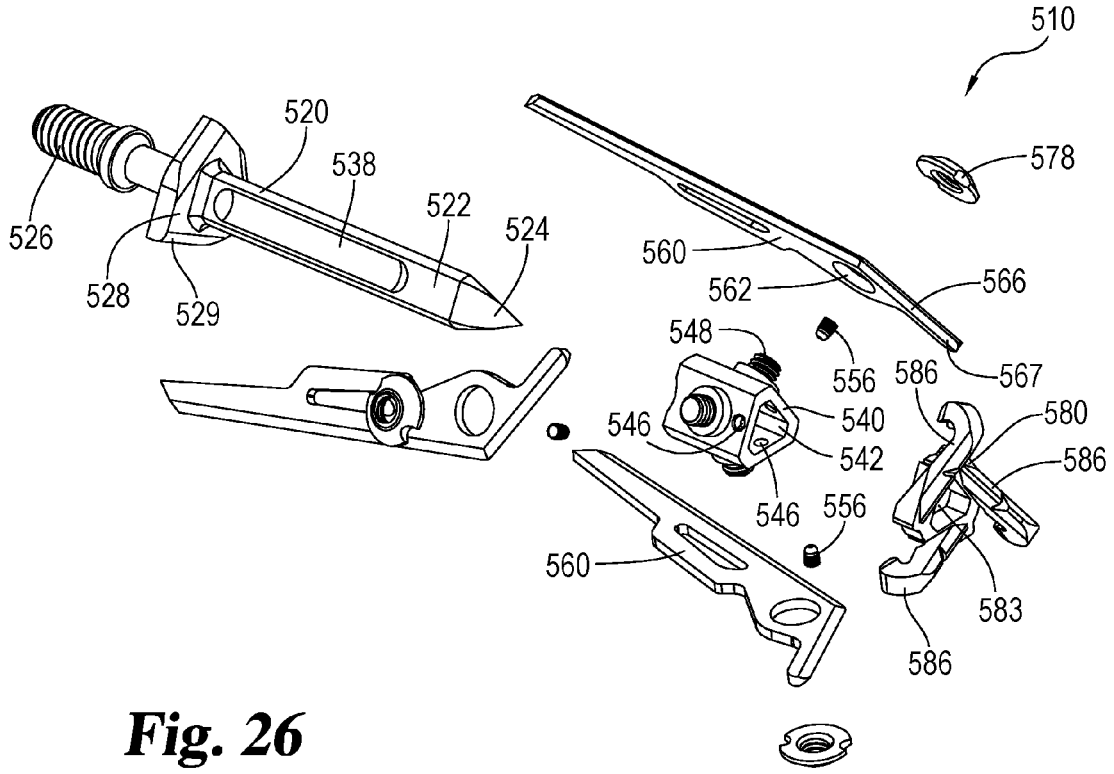
FIG. 26 is an exploded view of the broadhead of FIG. 24.

FIG. 24 illustrates broadhead 510 in a closed configuration. In the closed position, hub 540 is at its forwardmost position, adjacent to tip 524. In the closed position, the length of blades 560 is closer to parallel to shaft 522. The retention notch 572 of each blade abuts a forward face of shelf 528. FIG. 25 illustrates broadhead 510 in an open configuration. In the open position, hub 540 is at its rearwardmost position, adjacent to shelf 528. In the open position, the length of blades 560 diverges substantially and is closer to perpendicular to shaft 522.

Figure 27:
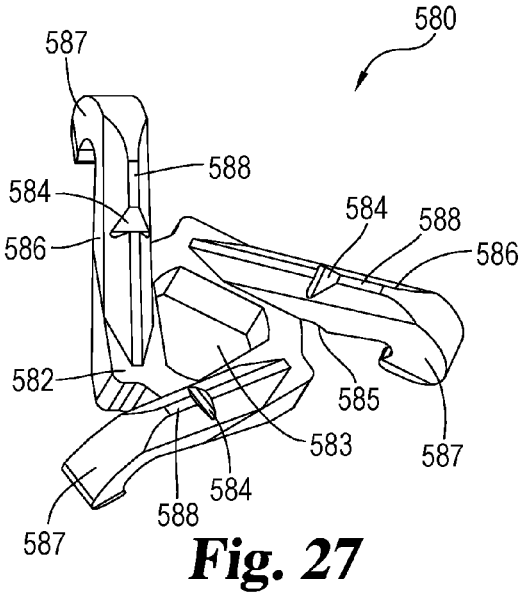
FIGS. 27-28 are views of the slider of the embodiment of FIG. 24.
Figure 28:
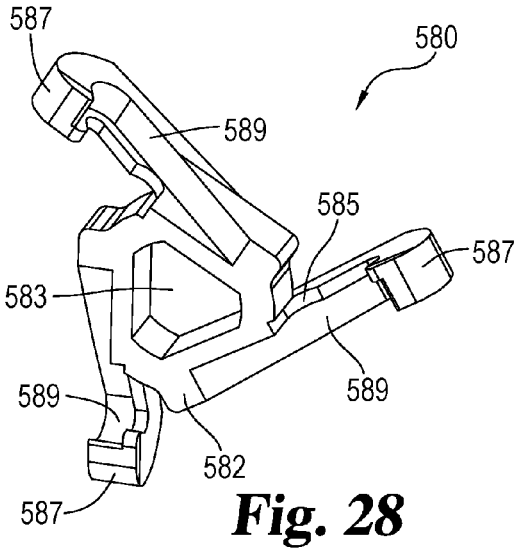

In certain embodiments, arranged forward of hub 540 and blades 560 is a deployment slider 580, shown in detail in FIGS. 27-28. In some alternate embodiments, slider 580 can be omitted. Deployment slider 580 includes a body or base portion 582 which defines an interior passage 583 with a cross-section sized and shaped to encircle and approximately match the cross-section of the tip and shaft of broadhead 510. Optionally, the cross-section of passage 583 inhibits rotation of slider 580 with respect to shaft 522. When assembled, the rearward surface of body portion 582 abuts the forward surface of hub 540.

Slider 580 includes impact arms 586 which extend laterally in front of each blade 560. The illustrated embodiment includes three impact arms 586. Each impact arm 586 defines a forward facing impact edge or surface 588. Optionally, each forward facing impact edge 588 may be sharpened to provide a forward facing cutting edge. The rearward face of each impact arm 586 defines a profile surface with a length, width and slope which matches, covers and abuts the forward edge 566 of one of the blades 560 when the broadhead is in the closed position. Optionally, the blade cutting edges 566 and impact arms 586 may be sloped slightly forward and outward. The rearward face of the impact arm 586 may optionally define a slot, groove or shelf 589 which receives the blade forward edge 566 in a nesting arrangement. FIG. 28 illustrates the rearward shelf 589 forming an "L" shape with a rearward face to abut the front of edge 566, and a slight rearward extending flange or projection which extends parallel to blade 560 and partially adjacent a side of edge 566.

Impact arms 586 extend to outer ends 587. In the illustrated embodiment, outer ends 587 are each curved rearward in a hook shape. The rearward face of each outer end 587 may receive and partially encircle a blade leading tip or corner 567. The rearward face of the outer ends 587 may optionally define a slot or groove which receives the blade tip 567 in a nesting arrangement.

Slider 580 engages and retains blades 560 in the closed position to inhibit rotation of the blades prior to launch and during flight. Optionally, the slider may snugly engage the blade edges and encircle the tips in a snap-on type of action. The impact arms 586 are predominately rigid but may be slightly bent forward during engagement to allow the ends 587 to flex and "snap" around the respective blade tips 567. In the closed arrangement, slider 580 may apply a neutral retaining force or an inward biasing force to blade tips 567 to retain the blades 560 in the closed position.

Detailed views of slider 580 are shown in FIGS. 27-28. Slider 580 may be made for multiple uses, or may be a disposable and replaceable component. In certain embodiments, arms 586 are intended to remain connected to body 582 during and after use. In certain other embodiments, arms 586 are designed to disconnect by breaking away from slider body 582 upon impact, as illustrated in FIG. 25. In some embodiments, slider 580 defines breakaway notches between slider body 582 and a portion of each arm 586. Breakaway notches are, for example, an indented area forming a smaller and cross-sectional area connection and thus define weak points in the slider. Upon impact, force transmitted along the slider will cause the impact arm to break-away from the slider body 582 at the notch as a defined breakage point. In some embodiments, forward breakaway notches 584 are defined inward along the upper edge or face at or adjacent the junction between an impact arm 586 and slider body 582. In some embodiment, rearward breakaway notches 585 are defined along the rearward edge or face at the junction between an impact arm 586 and slider body 582. Slider 580 may be made from various materials as discussed herein.

When used with a bow and arrow, broadhead 510 may be fired at a target. During storage, prior to launch, and in flight prior to impact, the broadhead 510 preferably remains in the closed position, preferably having aerodynamic properties. The impact edges 586 of the slider 580 define impact surfaces when the broadhead strikes a target. The tip 524 initially impacts a target and begins to penetrate directly or less preferably with a glancing blow. As the tip enters the target, the target surface moves along and around the tip and then impacts the forward surfaces of the impact arms and body. The contact of the target surface with the slider creates resistance and applies rearward force to the slider. If present, the sharpened forward edges 588 of the impact arms enhance engagement and cutting of the target. The initial impact force pushes the impact arms rearward along with the blade leading edges, causing an initial rotational movement in blades 560. This causes an initial rotation of the blades to disengage the blade tips 567 from the outer ends 587 of slider 580. As part of this initial rotation, impact arms 586 may breakaway and disconnect from slider body 580. If present, forward sharpened edges 566 of the blades assist in applying force to cause the impact arms 586 to breakaway.

As the broadhead continues to travel forward, the target surface continues to apply rearward force to the slider. This in turn applies rearward force to the hub 540 and hub assembly including blades 560. If present, the sharpened forward edges 566 of the blades enhance engagement and cutting of the target. As hub 540 begins to translate rearward, the camming portion 570 of each blade may be slidably pushed against a respective camming surface 529, assisting, via a camming or wedging force, the blade primary cutting edges 564 to radially rotate and expand outward. Hub 540 translates rearward until it abuts shelf 528 while blades 560 expand outward. When hub 540 is in the rearward position, locking notches of the blades engage shelf 528 to lock the blades in the expanded position.

If arms 586 have disconnected from slider body 582 during impact, only the slider body will remain on shaft 522, as illustrate in FIG. 25. To reset broadhead 510 to the closed position, the hub and blade assembly is pulled forward relative to shaft 522. If slider 580 is reusable, the tips 567 of blades 560 are engaged with impact arms 586. Alternately, a remnant slider body 582 may be removed and a new slider 580 may be placed over tip 524 and situated to engage blades 560.

FIGS. 31-34 show views of an alternate embodiment of a broadhead generally designated 610. Except as discussed herein, the structure and function of broadhead 610 is the same as or comparable to broadheads 10 and 410 and will not be fully repeated for brevity.

The broadhead 610 is adapted for mounting to an open end of a hollow arrow shaft. The broadhead 610 includes a body or ferrule 620. Body 620 has a forward end with a pointed tip 624, and a rearward end 626 configured to be connected to an arrow shaft. In the illustrated embodiment, tip 624 is a separate piece which may be connected to a bore in the forward portion of body 620, for example via a threaded engagement. In this embodiment, tip 624 has a rearward base 625 with a larger cross-section than the cross-section of the shaft portion so that base protrudes beyond the shaft. Hub 640 is slidably mounted and retained on body 620 between base 625 and shelf 628. Hub 640 is operable to translate forward or rearward along the shaft portion of body 620 between hub base 625 and shelf 628. Hub 640 includes mounting posts 648 which extending outward perpendicular to the longitudinal axis of the shaft. Mounting posts 648 are arranged on exterior sides of hub 640.

One or more cutting blades 660 are pivotally attached to the exterior of hub 640. In the illustrated embodiment, a pair of blades 660 are pivotally mounted to hub 640. As illustrated, the planes of the two blades are parallel to each other on opposing sides of the longitudinal axis of shaft 622. Alternately a three-bladed version can be used, with the blades equally spaced around hub 640. Hub 640 may triangular in a three-blade arrangement. A pivot axle opening 662 defined in each blade is mounted over a mounting post 648 so that the mounting post acts as an axle for the blade. The blades are secured to the exterior of hub 640 via the mounting posts 648 while remaining operable to pivot. A locknut 678 can be used to retain the blades on the mounting posts.

Each blade 660 is elongated in shape, and includes an outward cutting edge. Typically the cutting edge is sharpened to cut a target such as an animal. Each blade further defines a pivot control point, such as pivot control opening 666 offset from the pivot axle opening 662. The offset distance of pivot control opening 666 from pivot axle opening 666 defines a lever arm which can be used to control rotation of blade 660. Each blade 660 may further include an inward edge, with certain embodiments having a central camming portion, a retention notch and a locking notch, as discussed in detail with respect to other embodiments.

Figure 31:
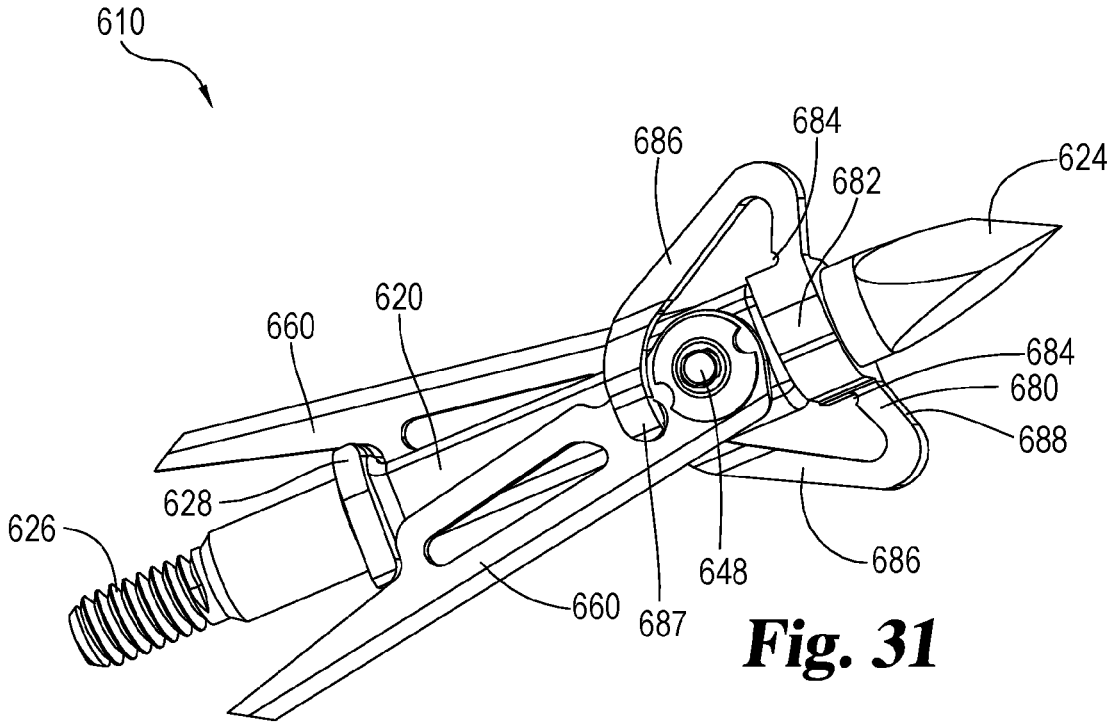
FIG. 31 a perspective view of an alternate embodiment of a broadhead in a closed position.
Figure 32:
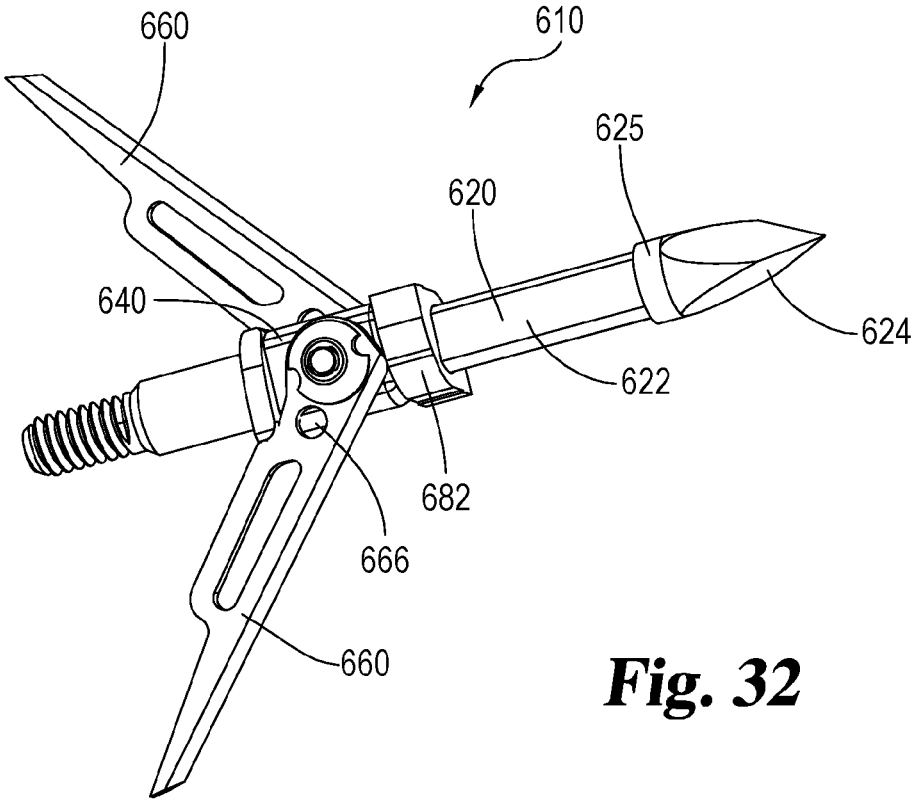
FIG. 32 is a view of the embodiment of FIG. 31 in an open position.
Figure 33:
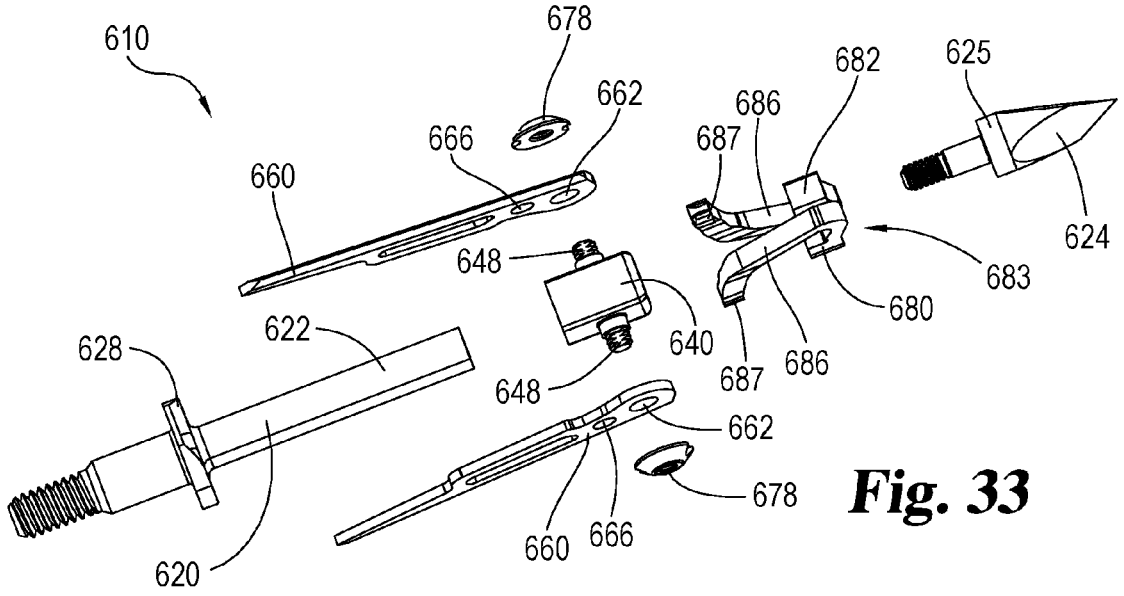
FIG. 33 is an exploded view of the broadhead of FIG. 31.

FIG. 31 illustrates broadhead 610 in a closed configuration. FIG. 32 illustrates broadhead 610 in an open configuration. In the open position, hub 640 is at its rearwardmost position. In the open position, the length of blades 660 is closer to perpendicular to the longitudinal axis of body 620.

Figure 34:
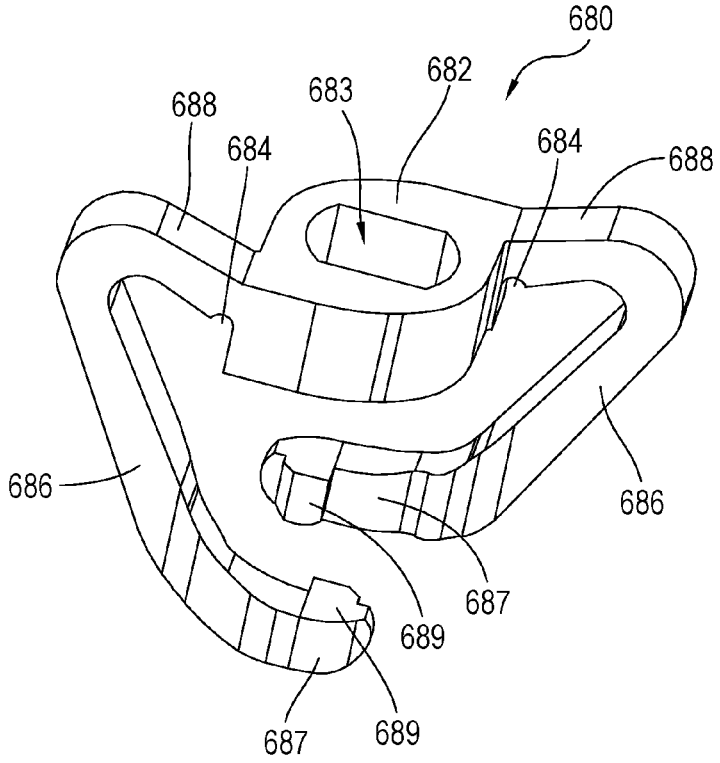
FIG. 34 is a view of the slider of the embodiment of FIG. 31.

Arranged forward of hub 640 and blades 660 is a deployment slider 680, shown in detail in FIG. 34. Deployment slider 680 includes a body or base portion 682 which defines an interior passage 683 with a cross-section sized and shaped to encircle and approximately match the cross-section of the shaft portion of broadhead body 620. Slider 680 is slidably mounted on body 620 with hub 640. The rearward surface of base portion 682 abuts the forward surface of hub 640.

Slider 680 includes impact arms 686 which extend laterally. Each impact arm 686 defines a forward facing impact edge or surface 688. Optionally, each forward facing impact edge 688 may be sharpened to provide an additional cutting edge. Each impact arm 686 extends laterally, rearwardly and then inwardly at a rearward position to a rearward end 687 adjacent to and engaging the pivot control opening 666 of one of the blades. Rearward end 687 is arranged in an offset and cantilevered position relative to body 682. The forward lateral portion may be angled forward from base portion 682, and the rearward portion may be tapered inward and rearward. Movement or flexing of arm 686 causes rearward end 687 to move relative to body 682, for example laterally in a relative rotational movement. Rearward end 687 may define a projection or tab portion 689 which is received within and engages pivot control opening 666.

Each impact arm 686 engages a pivot opening 666 to hold a blade 660 in the closed position of broadhead 610 to inhibit rotation of the blades prior to launch and during flight. In the closed arrangement, slider 680 may apply a neutral retaining force or an inward biasing force to retain the blades 660 in the closed position.

Slider 680 may be made for multiple uses, or may be a disposable and replaceable component. In certain embodiments, arms 686 are intended to remain connected to body 682 during and after use and may or may not remain engaged with pivot control openings 666 during deployment. In certain other embodiments, arms 686 are designed to disconnect from slider body 682 upon impact. In some embodiments, slider 680 defines breakaway notches 684 between slider body 682 and each arm 686. Breakaway notches 684 define weak points in the slider. Upon impact, force transmitted along the slider will cause the impact arms to break-away from the slider body 682 at the notches as defined breakage points. In some embodiments, forward breakaway notches may be defined inward along the upper edge or face at the junction between an impact arm 686 and slider body 682. In some embodiments, rearward breakaway notches are defined along the rearward edge or face at the junction between an impact arm 686 and slider body 682. Slider 680 may be made from various materials as discussed herein.

When used with a bow and arrow, broadhead 610 may be fired at a target. During storage, prior to launch, and in flight prior to impact, the broadhead 610 preferably remains in the closed position, preferably having aerodynamic properties. The contact of the target surface with the tip and the slider creates resistance and applies rearward force to the slider. The initial impact force pushes the impact arms rearward. This applies a rearward impulse to the outer ends for the forward arm portions 688, which by extension causes rearward ends 687 to move, for example laterally in a relative rotational movement. The movement of rearward ends 687 causes an initial rotational movement in blades 660. This initial rotation disengages the rearward portion of the blades, allowing the retention notches to disengage from shelf 628. As part of this initial rotation, impact arms 686 may breakaway and disconnect from slider body 680 or disengage from pivot control openings 666.

As the broadhead continues to travel forward, the target surface continues to apply rearward force to the slider. This in turn applies rearward force to the hub assembly including hub 640 and blades 660. As hub 640 translates rearward the blades radially rotate and expand outward.

If arms 686 have disconnected from slider body 682 during impact, only a cylindrical slider body 682 will remain on the shaft, as illustrated in FIG. 32. To reset broadhead 610 to the closed position, the hub and blades are pulled forward relative to shaft 622. If slider 680 is reusable, the arms 686 are re-engaged with pivot openings 666. Alternately, a remnant slider body 682 may be removed, by removing tip 624, and a new slider 680 may be placed on the shaft and situated to engage blades 660 before remounting tip 624.

FIGS. 35-38 show views of an alternate embodiment of a broadhead generally designated 710. Except as discussed herein, the structure and function of broadhead 710 is the same as or comparable to broadheads 10, 410 and 610 and will not be fully repeated for brevity.

The broadhead 710 includes a body or ferrule 720. Body 720 has a forward end with a pointed tip 724, and a rearward end 726 configured to be connected to an arrow shaft. In the illustrated embodiment, tip 724 is a separate piece which may be connected to a bore in the forward portion of body 720, for example via a threaded engagement. In this embodiment, tip 724 has a rearward base 725 with a larger cross-section than the cross-section of the shaft portion of body 720 so that base protrudes beyond the shaft. Hub 740 is slidably mounted and retained on body 720 between the base of tip 724 and shelf 728. Hub 740 is operable to translate forward or rearward along the shaft portion of body 720. Hub 740 includes a pair of mounting posts 748 extending outward perpendicular to the longitudinal axis of the shaft. Mounting posts 748 are arranged on opposing exterior sides of hub 740.

One or more cutting blades 760 are pivotally attached to the exterior of hub 740. In the illustrated embodiment, a pair of blades 760 are pivotally mounted to hub 740. As illustrated, the planes of the two blades are parallel to each other on opposing sides of the longitudinal axis of shaft 722. Alternately a three-bladed version can be used, with the blades equally spaced around hub 740. The shaft portion and hub 740 may be triangular in a three-blade arrangement. A pivot axle opening 762 defined in each blade is mounted over a mounting post 748 so that the mounting post acts as an axle for the blade. The blades are secured to the exterior of hub 740 via the mounting posts 748 using a locknut 778.

Each blade 760 is elongated in shape, and includes an outward cutting edge. Typically the cutting edge is sharpened to cut a target such as an animal. Each blade further defines a pivot control point, for example a pivot tab 766 offset from the pivot axle opening 762. The offset distance of pivot tab 766 from pivot axle opening 762 defines a lever arm which can be used to control rotation of blade 760. Each blade 760 further includes an inward edge, with certain embodiments having a central camming portion, a retention notch and a locking notch, as discussed in detail with respect to other figures.

Figure 35:
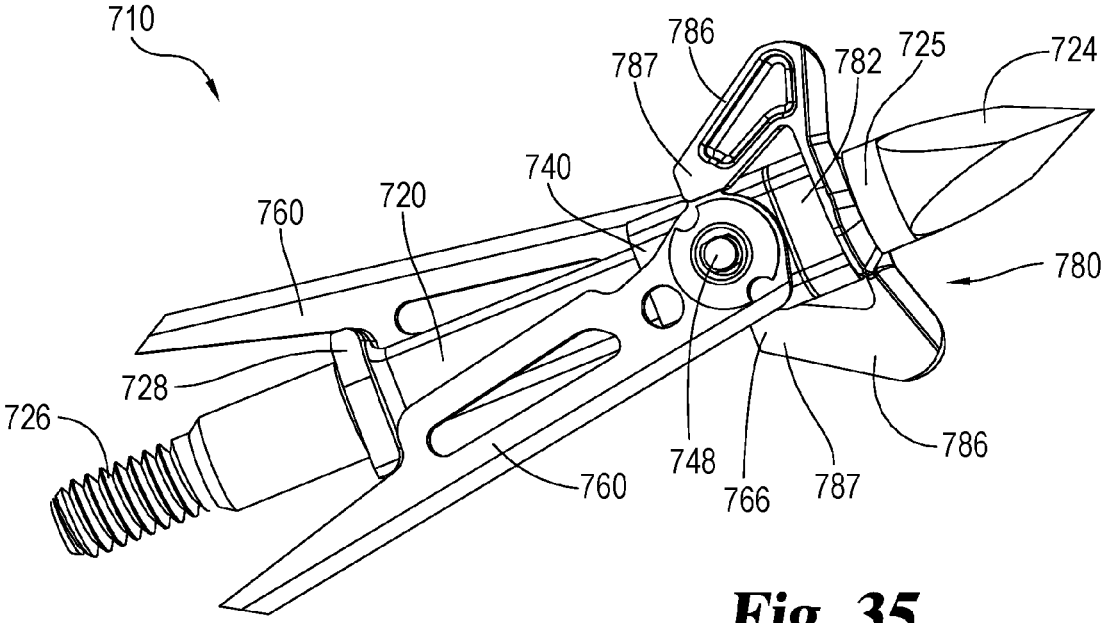
FIG. 35 a perspective view of an alternate embodiment of a broadhead in a closed position.
Figure 36:
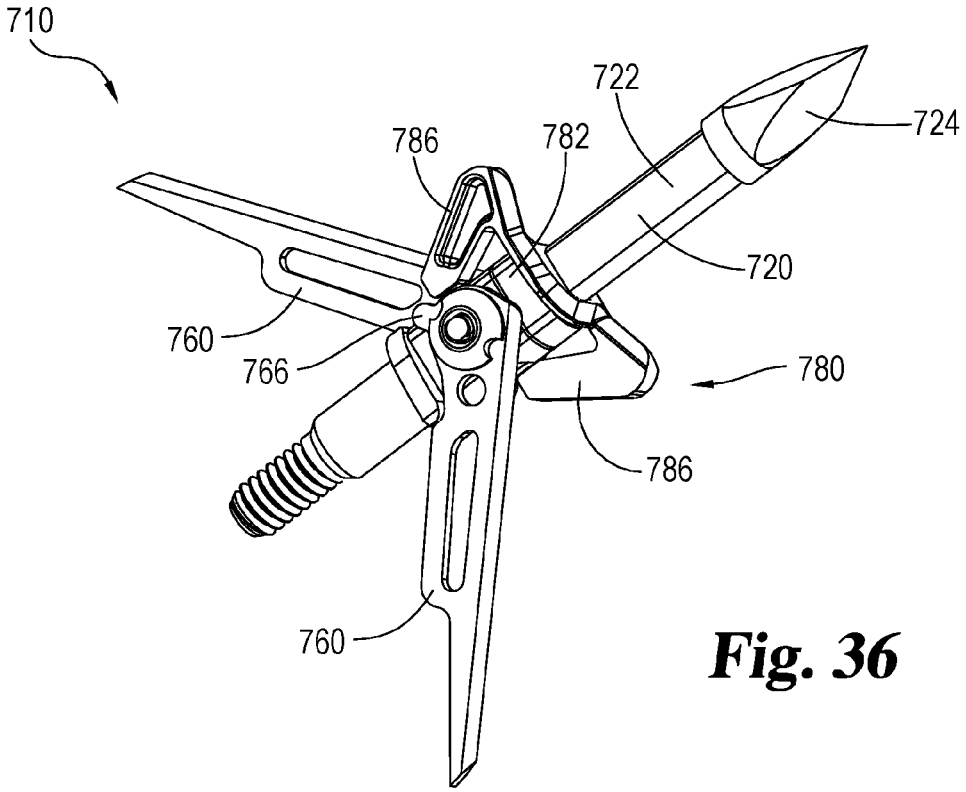
FIG. 36 is a view of the embodiment of FIG. 35 in an open position.
Figure 37:
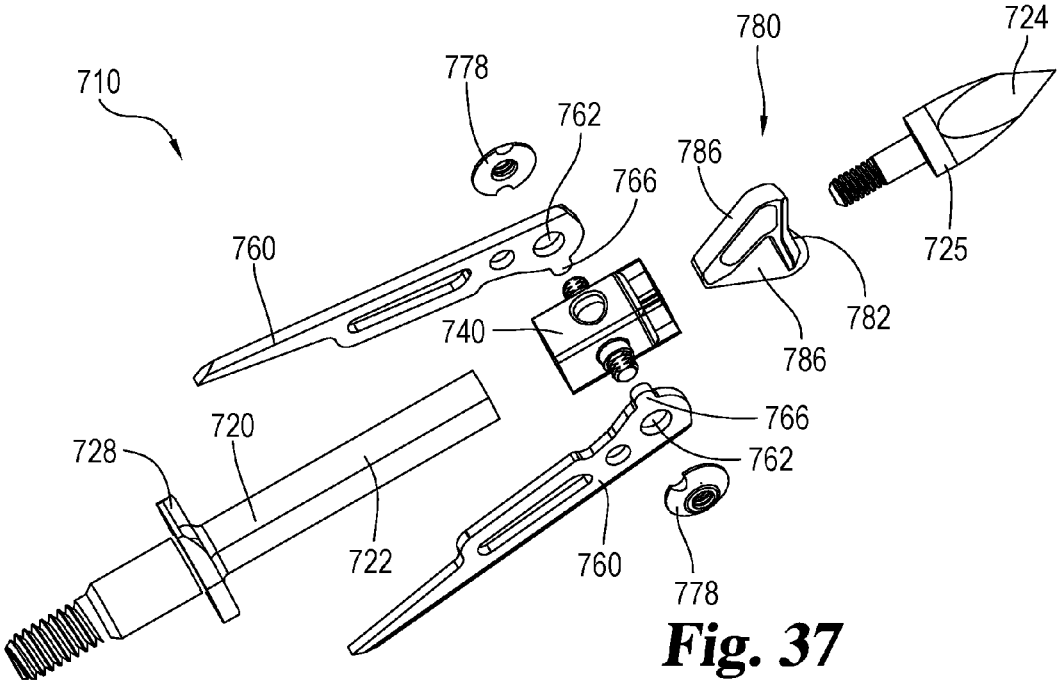
FIG. 37 is an exploded view of the broadhead of FIG. 35.

FIG. 35 illustrates broadhead 710 in a closed configuration. FIG. 36 illustrates broadhead 710 in an open configuration. In the open position, hub 740 is at its rearwardmost position. In the open position, the length of blades 760 diverges substantially from body 720.

Figure 38:
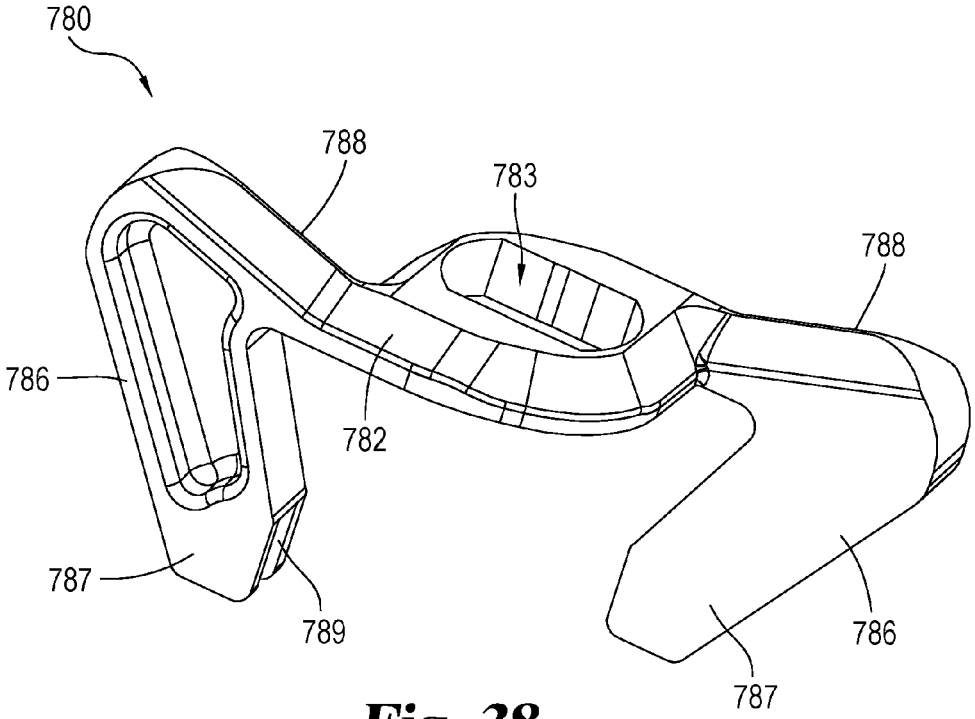
FIG. 38 is a view of the slider of the embodiment of FIG. 35.

Arranged forward of hub 740 and blades 760 is a deployment slider 780, shown in detail in FIG. 38. Deployment slider 780 includes a body or base portion 782 which defines an interior passage 783 with a cross-section sized and shaped to encircle and approximately match the cross-section of the shaft portion of broadhead body 720. Slider 780 is slidably mounted and retained on body 720 with hub 740 between the base of tip 724 and shelf 728. Optionally, the cross-section of passage 783 prevents rotation of slider 780 with respect to the shaft. The rearward surface of body portion 782 abuts the forward surface of hub 740.

Slider 780 includes impact arms 786 which extend laterally. Each impact arm 786 defines a forward facing impact edge or surface 788. Optionally, each forward facing impact edge 788 may be sharpened to provide an additional cutting edge. In this embodiment, each impact arm 786 extends laterally, rearwardly and then inwardly to a rearward end 787 adjacent the pivot tab 766 of one of the blades. Rearward end 787 is arranged in an offset and cantilevered position relative to body 782. The forward lateral portion may be angled forward from base portion 782, and the rearward portion may be tapered inward and rearward. Flexing of arm 786 causes rearward end 787 to move relative to body 782, for example laterally in a relative rotational movement. Rearward end 787 may define a notch or cavity 787 which engages a pivot point on the blade for example pivot tab 766 in a tab-in-notch arrangement.

Impact arms 786 engage pivot tabs 766 to hold blades 760 in the closed position of broadhead 710 to inhibit rotation of the blades prior to launch and during flight. In the closed arrangement, slider 780 may apply a neutral retaining force or an inward rotational biasing force to retain the blades 760 in the closed position.

Slider 780 may be made for multiple uses, or may be a disposable and replaceable component. In certain embodiments, arms 786 are intended to remain connected to body 782 during and after use. In certain other embodiments, arms 786 are designed to disconnect from slider body 782 upon impact. In some embodiments, slider 780 defines breakaway notches between slider body 782 and each arm 786. Breakaway notches define weak points in the slider. Upon impact, force transmitted along the slider will cause the impact arms to break away from the slider body 782 at the notches as defined breakage points. Slider 780 may be made from various materials as discussed herein.

When used with a bow and arrow, broadhead 710 may be fired at a target. During storage, prior to launch, and in flight prior to impact, the broadhead 710 preferably remains in the closed position, preferably having aerodynamic properties. The tip 724 initially impacts a target and begins to penetrate directly or less preferably with a glancing blow. As the tip enters the target, the target surface moves along and around the tip and then impacts the forward surfaces of the impact arms and body portion. The contact of the target surface with the slider creates resistance and applies rearward force to the slider. The initial impact force pushes the impact arms rearward. This applies a rearward impulse to the outer ends of the forward arm portions 788, which causes rearward ends 787 to move, for example rearward in a relative rotational movement. The movement of rearward ends 787 causes an initial rotational movement in blades 760. As part of this initial rotation, the impact arms may flex rearward or impact arms 786 may breakaway and disconnect from slider body 780. Alternately, pivot tabs 766 may rotate out of engagement with notches 789.

As the broadhead continues to travel forward, the target surface continues to apply rearward force to the slider. This in turn applies rearward force to the hub and blade assembly. As the assembly translates rearward, the blades radially rotate and expand outward.

If arms 786 have disconnected from slider body 782 during impact, only a remnant, approximately cylindrical slider body 782 will remain on the shaft. To reset broadhead 710 to the closed position, the hub and blade assembly is pulled forward relative to the shaft portion. If slider 780 is reusable, the arms 786 are re-engaged with pivot tabs 766. Alternately, a remnant slider body 782 may be removed, by removing tip 724, and a new slider 780 may be placed on the shaft and situated to engage blades 760 before remounting tip 724.

While the embodiments have been illustrated and described in detail in the drawings and foregoing description, the same is to be considered as illustrative and not restrictive in character, it being understood that only the preferred embodiments have been shown and described and that all changes and modifications that come with the spirit of the disclosure are desired to be protected.

What is claimed is:

1. A broadhead arrowhead, comprising:

a broadhead body adapted to attach to an arrow shaft, the broadhead body having a forward end and having a shaft portion, the shaft portion defining a longitudinal axis;

a blade assembly slidably mounted on the shaft portion, including at least one blade pivotally operable between a closed position and an open position;

a deployment slider arranged on the broadhead body forward of the blade assembly, the deployment slider having a slider body and at least one laterally extending impact arm, with the impact arm engagable with the at least one blade to retain the blade in a closed position;

wherein after the initial impact, the slider body and the blade assembly move rearward relative to the shaft portion whereupon during the rearward movement the at least one blade is forced to rotate outward to a deployed position.

2. The broadhead arrowhead of claim 1, comprising:

a plurality of pivotally mounted blades in the blade assembly equally spaced around the shaft portion, each blade operable between a closed position and an open position, and the deployment slider having a plurality of laterally extending impact arms with each arm retaining a respective blade in a closed position.

3. The broadhead arrowhead of claim 2, wherein each impact arm extends to engage a pivot control opening defined in one of the blades.

4. The broadhead arrowhead of claim 3, wherein each impact arm extends laterally and then rearwardly and inwardly to a rearward end adjacent to and engaging a pivot control point defined in a respective one of the blades.

5. The broadhead arrowhead of claim 4, wherein the forward lateral portion of each impact arm is angled forward from the slider body.

6. The broadhead arrowhead of claim 4, wherein each rearward end is arranged in an offset and cantilevered position relative to the slider body.

7. The broadhead arrowhead of claim 2, wherein in the closed arrangement, said slider applies a neutral retaining force or an inward biasing force to retain the blades in the closed position.

8. The broadhead arrowhead of claim 7, wherein each impact arm defines a sharpened forward facing impact edge.

9. The broadhead arrowhead of claim 2, wherein each impact arm is designed to break away from the slider body upon impact.

10. The broadhead arrowhead of claim 9, comprising breakaway notches defined between the slider body and each arm to form defined breakage points.

11. The broadhead arrowhead of claim 10, wherein rearward breakaway notches are defined along the rearward edge of the arm adjacent the junction between each impact arm and the slider body.

12. A broadhead arrowhead, comprising:

a broadhead body adapted to attach to an arrow shaft, the broadhead body having a forward end and having a shaft portion, the shaft portion defining a longitudinal axis;

a blade assembly slidably mounted on the shaft portion and including a plurality of pivotally mounted blades, each blade operable between a closed position and an open position;

wherein each blade defines a pivot control point offset from the pivotal mounting point;

a deployment slider arranged on the broadhead body forward of the blade assembly, the deployment slider having a slider body and a plurality of impact arms, with each impact arm engagable with the pivot control point of a respective blade; and, wherein upon an initial impact, each arm operates on a respective pivot control point to cause the respective blade to rotate, wherein after the initial impact, the slider body and the blade assembly move rearward relative to the shaft portion and wherein during the rearward movement the blades rotate outward to a deployed position.

13. The broadhead arrowhead of claim 12, wherein each impact arm extends laterally and rearwardly to a pivot control point.

14. The broadhead arrowhead of claim 13, wherein the pivot control point of each blade is a pivot tab.

15. The broadhead arrowhead of claim 14, wherein each impact arm defines a notch which engages a pivot tab.

16. The broadhead arrowhead of claim 13, wherein the pivot control point of each blade is a pivot control opening.

17. The broadhead arrowhead of claim 12, wherein each impact arm is designed to break away from the slider body upon impact.

18. The broadhead arrowhead of claim 17, comprising breakaway notches defined adjacent the junction between the slider body and each impact arm to form defined breakage points.

19. A broadhead arrowhead, comprising: a broadhead body adapted to attach to an arrow shaft, the broadhead body having a forward end and having a shaft portion, the shaft portion defining a longitudinal axis;

a blade assembly slidably retained on the shaft portion including a plurality of pivotally mounted blades operable between a closed position and an open position, each blade including a sharpened outward cutting edge, and each blade defining a plane parallel to and offset from the longitudinal axis;

a deployment slider arranged on the broadhead body forward of the blade assembly, the deployment slider having a slider body and a plurality of impact arms, with each impact arm extending laterally in front of the forward facing edge of a respective blade.

*20. A broadhead arrowhead, comprising:*

*a broadhead body adapted to attach to an arrow shaft, the broadhead body having a forward end and having a shaft portion, the shaft portion defining a longitudinal axis;*

*a blade assembly slidably mounted on the shaft portion, including at least one blade pivotally operable between a closed position and an open position;*

*a retaining element arranged on the broadhead body forward of the blade assembly, the retaining element having a body and at least one extending impact arm, with the impact arm engagable with the at least one blade to retain the blade in a closed position;*

*wherein after the initial impact the at least one blade is forced to rotate outward to a deployed position.*

*21. The broadhead arrowhead of claim 20, comprising: a plurality of pivotally mounted blades in the blade assembly equally spaced around the shaft portion, each blade operable between a closed position and an open position, and the retaining element having a plurality of laterally extending impact arms with each arm retaining a respective blade in a closed position.*

*22. The broadhead arrowhead of claim 21, wherein in the closed arrangement, said retaining element applies a neutral retaining force or an inward biasing force to retain the blades in the closed position.*

*23. The broadhead arrowhead of claim 21, wherein each impact arm is designed to break away from the retaining element body upon impact.*

*24. The broadhead arrowhead of claim 23, comprising breakaway notches defined between the retaining element body and each arm to form defined breakage points.*

*25. The broadhead arrowhead of claim 21, wherein each impact arm extends to engage a pivot control point defined on a respective one of the blades.*

*26. The broadhead arrowhead of claim 21, wherein each impact arm extends to an outer end which is curved rearward forming a hooked shape, wherein the hooked shape partially encircles a blade leading tip.*

*27. The broadhead arrowhead of claim 21, wherein each impact arm is bent slightly forward while engaging a blade tip and applies a biasing force to retain the blades in the closed position.*

*28. A broadhead arrowhead, comprising:*

*a broadhead body adapted to attach to an arrow shaft, the broadhead body having a forward end and having a shaft portion, the shaft portion defining a longitudinal axis;*

*a blade assembly including a hub slidably mounted around the shaft portion, and including at least one blade pivotally mounted on an axle and operable between a closed position and an open position;*

*a retaining element engagable with the at least one blade to retain the blade in a closed position;*

*wherein after the initial impact, the blade axle moves rearward relative to the shaft portion whereupon during the rearward movement the at least one blade is forced to rotate outward to a deployed position.*

*29. The broadhead arrowhead of claim 28, wherein in the closed arrangement, said retaining element applies an inward biasing force to retain the at least one blade in the closed position.*

*30. The broadhead arrowhead of claim 28, wherein in the closed arrangement, said retaining element applies a neutral retaining force to retain the at least one blade in the closed position.*

*31. The broadhead arrowhead of claim 28, wherein a rearward portion of the shaft portion transitions into a shelf extending radially outward from the shaft portion, wherein an edge of the shelf forms a camming surface for an inward edge of the at least one blade.*

*32. A broadhead arrowhead, comprising:*

*a broadhead body adapted to attach to an arrow shaft, the broadhead body having a shaft portion;*

*a blade assembly including a hub slidably mounted around the shaft portion and including a plurality of blades pivotally mounted to the hub, wherein each blade is rotatable between a closed position and an open position;*

*wherein a rearward portion of the shaft portion transitions into a shelf extending radially outward from the shaft portion, wherein edges of the shelf form camming surfaces for an inward edge of each blade;*

*wherein after the initial impact, the hub moves rearward relative to the shaft portion whereupon each blade is forced to rotate outward by a camming surface and wherein the rearward movement of the hub synchronizes the plurality of blades to rotate at the same rate.*

*33. A broadhead arrowhead, comprising:*

*a broadhead body adapted to attach to an arrow shaft, the broadhead body having a shaft portion;*

*at least one elongated axial groove defined on a side of the shaft portion;*

*a blade assembly including a hub slidably mounted on the shaft portion and including a plurality of blades pivotally mounted to the hub, wherein each blade is rotatable between a closed position and an open position; and,*

*at least one retaining pin mounted through an opening defined in sides of the hub with an inward end of the retaining pin received in the axial groove, wherein the retaining pin prevents the hub from sliding off of the shaft yet allows the hub to freely translate along the shaft within a range defined by the axial groove.*

*34. The broadhead arrowhead of claim 33, a plurality of elongated axial grooves defined on sides of the shaft portion and a plurality of retaining pins mounted through openings defined in sides of the hub with an inward end of each retaining pin received in an axial groove.*

*35. The broadhead arrowhead of claim 34, wherein the retaining pins are pushed into the openings defined in the hub.*

*36. The broadhead arrowhead of claim 34, wherein the retaining pins have splined cylindrical sides which engage grooves in the hub openings.*

*37. The broadhead arrowhead of claim 34, wherein the retaining pins are threaded into the openings defined in the hub.*

*38. The broadhead arrowhead of claim 34, wherein the inward ends of the retaining pins are rounded.*

*39. The broadhead arrowhead of claim 34, comprising a material to facilitate sliding motion placed between each pin inward end and the respective groove.*

* * * * *